US007009489B2

(12) United States Patent
Fisher

(10) Patent No.: US 7,009,489 B2
(45) Date of Patent: Mar. 7, 2006

(54) ELECTRONIC LOCK SYSTEM AND METHOD FOR ITS USE

(75) Inventor: Scott R. Fisher, Cincinnati, OH (US)

(73) Assignee: SentriLock, Inc., Cincinnati, OH (US)

(*) Notice: Subject to any disclaimer, the term of this patent is extended or adjusted under 35 U.S.C. 154(b) by 459 days.

(21) Appl. No.: 10/172,316

(22) Filed: Jun. 14, 2002

(65) Prior Publication Data

US 2003/0231102 A1 Dec. 18, 2003

(51) Int. Cl.
*B60R 25/00* (2006.01)

(52) U.S. Cl. ........................ 340/5.7; 340/5.73; 340/5.6; 340/825; 340/3.1; 340/5.26; 235/492; 235/382

(58) Field of Classification Search ................. 340/5.7, 340/5.73, 5.6, 825, 3.1, 3.7, 5.26; 70/63; 109/45–49; 235/492, 382, 382.5
See application file for complete search history.

(56) References Cited

U.S. PATENT DOCUMENTS

| | | | |
|---|---|---|---|
| 1,996,450 | A | 4/1935 | Bes |
| 3,857,018 | A | 12/1974 | Stark et al. |
| 3,878,511 | A | 4/1975 | Wagner |
| 3,906,447 | A | 9/1975 | Crafton |
| 3,941,977 | A | 3/1976 | Voss et al. |
| 3,969,584 | A | 7/1976 | Miller et al. |
| 3,971,916 | A | 7/1976 | Moreno |
| 4,079,605 | A | 3/1978 | Bartels |
| 4,092,524 | A | 5/1978 | Moreno |
| 4,148,012 | A | 4/1979 | Baump et al. |
| 4,148,092 | A | 4/1979 | Martin |
| 4,201,887 | A | 5/1980 | Burns |
| 4,296,404 | A | 10/1981 | Sheldon |
| 4,325,240 | A | 4/1982 | Gable |
| 4,353,064 | A | 10/1982 | Stamm |
| 4,396,914 | A | 8/1983 | Aston |

(Continued)

FOREIGN PATENT DOCUMENTS

EP 0 164 890 A1 12/1985

(Continued)

OTHER PUBLICATIONS

Advertising brochures of AZCORP Technology (no date indicated), 11 pages.

(Continued)

*Primary Examiner*—Michael Horabik
*Assistant Examiner*—Scott Au
(74) *Attorney, Agent, or Firm*—Frederick H. Gribbell

(57) ABSTRACT

An improved electronic lock system is provided for use with real estate lock boxes where there is the need for many people to access the secured compartment of the lock box in a controlled manner. Each user has an identification card with a non-volatile secure memory (known as a “smart card”), for exchanging data with the lock box, and with a portable computer capable of reading data from the smart card; or a cell phone can be used to gain access information from a central computer. The user first inserts the smart card into the connector attached to the lock box; the lock box reads the user's ID stored in the smart card memory and records this information in lock box memory. The lock box then transfers its access code information and other data to the smart card for further processing. The user then inserts the smart card in a portable card reader to learn the access code, or calls a central computer via a mobile phone system and interacts with the computer to elicit the necessary access code information. The access code is then manually keyed into the lock box keypad by the user to obtain access to the secure compartment.

32 Claims, 12 Drawing Sheets

U.S. PATENT DOCUMENTS

| | | | | |
|---|---|---|---|---|
| 4,411,144 | A | 10/1983 | Aydin | |
| 4,439,670 | A | 3/1984 | Basset et al. | |
| 4,509,093 | A | 4/1985 | Stellberger | |
| 4,525,805 | A | 6/1985 | Prosan et al. | |
| 4,532,783 | A | 8/1985 | Maurice | |
| 4,558,175 | A | 12/1985 | Genest et al. | |
| 4,575,719 | A | 3/1986 | Bertagna et al. | |
| 4,646,080 | A | 2/1987 | Genest et al. | |
| 4,665,397 | A | 5/1987 | Pinnow | |
| 4,686,529 | A | 8/1987 | Kleefeldt | |
| 4,690,780 | A | 9/1987 | Clark et al. | |
| 4,727,368 | A | 2/1988 | Larson et al. | |
| 4,743,898 | A | 5/1988 | Imedio | |
| 4,766,746 | A | 8/1988 | Henderson et al. | |
| 4,777,556 | A | 10/1988 | Imran | |
| 4,800,255 | A | 1/1989 | Imran | |
| 4,831,851 | A | 5/1989 | Larson | |
| 4,851,652 | A | 7/1989 | Imran | |
| 4,864,115 | A | 9/1989 | Imran et al. | |
| 4,887,292 | A | 12/1989 | Barrett et al. | |
| 4,896,246 | A | 1/1990 | Henderson et al. | |
| 4,914,732 | A | 4/1990 | Henderson et al. | |
| 4,916,443 | A | 4/1990 | Barrett et al. | |
| 4,929,880 | A | 5/1990 | Henderson et al. | |
| 4,947,163 | A | 8/1990 | Henderson et al. | |
| 4,988,987 | A | 1/1991 | Barrett et al. | |
| 5,014,049 | A | 5/1991 | Bosley | |
| 5,046,084 | A | 9/1991 | Barrett et al. | |
| 5,090,222 | A | 2/1992 | Imran | |
| 5,245,652 | A | 9/1993 | Larson et al. | |
| 5,280,518 | A | 1/1994 | Danler et al. | |
| 5,475,375 | A | 12/1995 | Barrett et al. | |
| 5,488,660 | A | 1/1996 | Dawson et al. | |
| 5,550,529 | A | 8/1996 | Burge | |
| 5,602,536 | A | 2/1997 | Henderson et al. | |
| 5,643,696 | A | 7/1997 | Rowlette | |
| 5,654,696 | A | 8/1997 | Barrett et al. | |
| 5,705,991 | A | 1/1998 | Kniffin et al. | |
| 5,768,921 | A | 6/1998 | Hill | |
| 5,791,172 | A | 8/1998 | Deighton et al. | |
| 5,794,465 | A | 8/1998 | Hill | |
| 5,815,557 | A | 9/1998 | Larson | |
| 6,072,402 | A | 6/2000 | Kniffin et al. | |
| RE37,011 | E | 1/2001 | Dawson et al. | |
| 6,344,796 | B1 * | 2/2002 | Ogilvie et al. | 340/568.1 |
| 6,624,742 | B1 * | 9/2003 | Romano et al. | 340/5.73 |
| 2003/0179075 | A1 | 9/2003 | Greenman | |

FOREIGN PATENT DOCUMENTS

| | | |
|---|---|---|
| FR | 2 478 178 | 3/1981 |
| FR | 2 519 160 | 12/1981 |
| GB | 1 582 989 | 1/1981 |
| WO | WO 86/00108 | 1/1986 |

OTHER PUBLICATIONS

Advertising brochures of MULTACC Corporation (no date indicated), 16 pages.

Advertising brochures of Supra Products, Inc. (1982), 8 pages.

Advertising brochures of Supra Products, Inc. (Nov. 29, 2001), 2 pages.

* cited by examiner

FIG. 2

EEPROM Memory Map

| | EEPROM Memory Map | | |
|---|---|---|---|
| Byte | Description | Type | Length |
| 00 | Lock Box to Program Serial # | 3 Bytes | 3 |
| 03 | Region Code | Word | 2 |
| 05 | Access Time Matrix | Byte | 42 |
| 47 | Listing Agent Name | String | 24 |
| 71 | Listing Agent Contact # | String | 16 |
| 87 | Showing By Appt. Code | String | 4 |
| 91 | Showing Instructions | String | 96 |
| 187 | Unused | Byte | 1 |
| 188 | Shackle Release Code | String | 5 |
| 193 | Lock Box Prog ID | Dword | 4 |
| | | | |
| 246 | Time Base | Dword | 4 |
| 250 | Adjust Time1 MMDD | Word | 2 |
| 252 | Adjust Value (minutes, bit 7=sign) | Byte | 1 |
| 253 | Adjust Time 2 MMDD | Word | 2 |
| 255 | Adjust Value (minutes, bit 7=sign) | Byte | 1 |

Lock Box Logic - Interrupt Service Routine

Lock Box Logic - Card Wake-Up/Interrupt Service Routine

Lock Box Logic - Timer Wake-Up/Interrupt Service Routine

Secure Memory Card Memory Map

FIG. 14

| | Page 0 - Card Holder Info | | |
|---|---|---|---|
| Byte | Description | Type | Length |
| 00 | Status Code | Byte | 1 |
| 01 | Card Holder Name | String | 24 |
| 25 | Card Holder Contact # | String | 16 |
| 41 | Card Holder PIN | String | 4 |
| 45 | Next Card Renewal Code | String | 4 |
| 49 | Card Expiration | Dword | 4 |
| 53 | Renewal Period (Days) | Byte | 1 |
| 54 | Region Code 1 | Word | 2 |
| 56 | Region Code 2 | Word | 2 |
| 58 | Region Code 3 | Word | 2 |
| 60 | Region Code 4 | Word | 2 |
| 62 | Region Code 5 | Word | 2 |
| 64 | Region Code 6 | Word | 2 |
| 66 | Region Code 7 | Word | 2 |
| 68 | Region Code 8 | Word | 2 |
| 254 | Hash Code | Word | 2 |

| | Page 1 - Lock Box Data | | |
|---|---|---|---|
| Byte | Description | Type | Length |
| 00 | Lock Box Serial # | Byte | 3 |
| 03 | Region Code | Word | 2 |
| 05 | Access Time Matrix | Byte | 42 |
| 47 | Listing Agent Name | String | 24 |
| 71 | Listing Agent Contact # | String | 16 |
| 87 | Showing By Appt. Code | String | 4 |
| 91 | Showing Instructions | String | 96 |
| 187 | Reserved for Future Use | Byte | 37 |
| | | | |
| 224 | Unused | Byte | 16 |
| | | | |
| 240 | Low Battery Alert | Byte | 1 |
| 241 | Key Compartment Access Code | String | 5 |
| 246 | Number of Showings | Word | 2 |
| 248 | Reserved for Future Use | Byte | 8 |

| | Page 2 - My Lock Boxes | | |
|---|---|---|---|
| Byte | Description | Type | Length |
| 00 | Count in Table (max=85) | Byte | 1 |
| 01-n | Lock Box Serial # | 3 Bytes | 3 |

| | Page 3 - New Lock Box Config. | | |
|---|---|---|---|
| Byte | Description | Type | Length |
| 00 | Lock Box to Program Serial # | 3 Bytes | 3 |
| 03 | Region Code | Word | 2 |
| 05 | Access Time Matrix | Byte | 42 |
| 47 | Listing Agent Name | String | 24 |
| 71 | Listing Agent Contact # | String | 16 |
| 87 | Showing By Appt. Code | String | 4 |
| 91 | Showing Instructions | String | 96 |
| 187 | Reserved for Future Use | Byte | 37 |
| | | | |
| 224 | Reserved for Future Use | Byte | 11 |
| 235 | Shackle Release Code | String | 5 |
| 240 | Lock Box Prog ID | Dword | 4 |
| 244 | Time Base | Dword | 4 |
| 248 | Adjust Time1 MMDD | Word | 2 |
| 250 | Adjust Value (minutes, bit 7=sign) | Byte | 1 |
| 251 | Adjust Time 2 MMDD | Word | 2 |
| 253 | Adjust Value (minutes, bit 7=sign) | Byte | 1 |
| 254 | Hash Code | Word | 2 |

| | Page 4 - Access Log Data | | |
|---|---|---|---|
| Byte | Description | Type | Length |
| 00 | Count in Table (max=50) | Byte | 1 |
| 01 | Lock Box Prog ID | DWord | 4 |
| 05 | Card Serial # | Byte | 3 |
| 08 | TimerTicks (10 minute intervals) | Word | 2 |

Memory Card Renewal - IVR System Logic

Low Battery Reporting - IVR System Logic

Access Code Delivery - IVR System Logic

ELECTRONIC LOCK SYSTEM AND METHOD FOR ITS USE

TECHNICAL FIELD

The present invention relates generally to electronic lock systems and is particularly directed to real estate lock box systems that provide an improvement in access code management. The invention is specifically disclosed as a lock box access system that uses a "smart card" with on-board non-volatile memory that receives a randomly-generated access code from a lock box, and in which that random access code is readable by a credit-card sized portable computer that first determines if the user is authorized to have access to the lock box before displaying the access code to the user.

BACKGROUND OF THE INVENTION

In the real estate industry, a need exists for controlled access to homes for sale that is both flexible to serve the real estate professional and secure for the homeowner's peace of mind. The traditional method has been the use of a key safe or lock box that attaches to the homeowner's doorknob and contains the dwelling key. Many conventional designs ranging from mechanical to electronic have been used over the years to provide this functionality. Homeowners prefer electronic systems because, unlike their mechanical counterparts, the electronic systems offer greater security and control over whom has access to the dwelling key and further offers the ability to track accesses to the key.

Homeowners also desire control over the time of day accessibility to their home for showing appointments, and they often have a need to communicate special showing instructions to potential visiting real estate sales professionals. Such instructions can frequently include home security system shutoff codes, a special instruction such as, "don't let the dog out of the basement," or other data pertinent to accessing the home. In addition, homeowners are reassured when they learn that all accesses to their dwelling key are recorded in a way that can identify the person accessing the key.

The needs of the real estate professional are as equally important as the needs of the homeowner. Accessing the secure compartment of the lock box must be easy to perform and there must be a simple way to manage multiple users who access multiple lock boxes. Programming lock box configuration information and retrieving access logs also needs to be simple and efficient.

The greatest challenge in previous designs has been the management and updating of electronic keys and electronic lock boxes with current access code information. The distribution of such information is compounded geometrically with the number of lock boxes and keys. This has not been a huge problem from the key side with the advent of central computer systems communicating with keys; however, conventional systems now in use have not addressed the fundamental problem of updating lock box devices that are dispersed over a large geographic area. The previous designs and prior art patent literature provide an updating function via a radio signal or a pager, however, these systems are impractical due to the receiving circuit's power drain and potential proximity constraints with respect to the physical locations of receiver and transmitter.

All of the convention electronic lock box systems have focused on loading electronic keys with access codes for use with lock boxes that could potentially be visited. In fact, these prior art systems have increasingly encompassed more costly and cumbersome electronic key solutions that are required to be periodically updated with new access codes.

It would be an improvement to provide a new method of access control of lock boxes using a simple to operate and manage system, using a new approach to the problem of access code synchronization between lock boxes and keys. Another improvement would be to provide an access code disclosure device that replaces conventional electronic keys, in which the access code disclosure device comprises a credit-card sized portable computer and a very thin secure memory card for a real estate agent for obtaining access to a lock box key compartment. A further improvement would be to use an access code that is randomly-generated in real time by the lock box.

SUMMARY OF THE INVENTION

Accordingly, it is an advantage of the present invention to provide a lock box system used in real estate sales systems in which the user carries a very small portable computer and a credit card-sized memory card that interfaces both to the portable computer and to a lock box. The lock box itself generates the access code as a random number, which the user can learn only by entering correct information on the portable computer after the portable computer reads data stored on the memory card after the memory card has interacted with the lock box electronics. The user manually enters the access code on a keypad of the lock box to obtain access to the key compartment.

It is another advantage of the present invention to provide a lock box system used in real estate sales systems in which the user carries a mobile telephone (or other communications device) and a credit card-sized memory card, in which the user receives an access code from a central "clearinghouse computer," and in which the access code periodically changes over time using an algorithm know both to the lock box and to the clearinghouse computer. The user manually enters the access code on a keypad of the lock box to obtain access to the key compartment.

It is a further advantage of the present invention to provide a lock box system used in real estate sales systems which has many different optional features, such as a "showing by appointment" feature that requires a special access code, and the ability to display special showing instructions.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for operating an electronic lock box system is provided, in which the method comprises the steps of: (a) providing an electronic lock box having a compartment with a controlled access member, a first memory circuit for storage of data, a first keypad, a first communications port, and a first processing circuit; (b) providing a portable computer having a second memory circuit for storage of data, a second keypad, a display, a second communications port, and a second processing circuit; (c) providing a portable memory device containing a non-volatile third memory circuit; (d) coupling the portable memory device to the first communications port of the electronic lock box so as to permit communications therebetween, and loading access code information from the first memory circuit to the third memory circuit; (e) uncoupling the portable memory device from the first communications port of the electronic lock box; (f) coupling the portable memory device to the second communications port of the portable computer so as to permit communications therebetween, and reading the access code information from the third memory circuit to the second memory circuit; (g) entering identification information using the second keypad, and if the identification information is correct as determined by the portable computer, displaying the access code information on the display to a human user; and (h) entering the access code information using the first keypad, and if the access code information is correct as determined by the first processing circuit, releasing the controlled access member of the compartment.

In accordance with another aspect of the present invention, a method for operating an electronic lock box system is provided, in which the method comprises the steps of: providing an electronic lock box having a first computer; providing a portable computer having a display; generating, at the first computer, a random number; determining, at the portable computer, whether a user has proper clearance to allow access to the electronic lock box, and if so displaying an appropriate access code on the display, the appropriate access code being based upon the random number; and entering the appropriate access code on a keypad of the electronic lock box, and thereafter releasing a controlled access member to obtain entry to a compartment of the electronic lock box.

In accordance with yet another aspect of the present invention, a method for operating an electronic lock box system is provided, in which the method comprises the steps of: providing an electronic lock box having a first computer; providing a second computer at a remote location from the first computer; providing a portable communications device used by a human user; providing a communication link between the second computer and the portable communications device; generating, at the first computer, a first plurality of pseudo random numbers that change at predetermined time intervals using a predetermined algorithm in conjunction with first predetermined seed data; generating, at the second computer, a second plurality of pseudo random numbers that change at predetermined time intervals using a predetermined algorithm in conjunction with second predetermined seed data, in which the first and second predetermined seed data are the same for the electronic lock box; accessing, using the portable communications device, the second plurality of pseudo random numbers over the communications link and thereby obtaining an access code; and entering the access code on a keypad at the first computer, and thereafter releasing a controlled access member to obtain entry to a compartment of the electronic lock box.

In accordance with still another aspect of the present invention, a method of operating an electronic lock box system is provided, in which the method comprises the steps of: providing a lock box with a secure compartment therein and a shackle for attachment to a fixed object; providing a secure memory device; providing a communications link used for exchanging data between the secure memory device and the lock box; providing a portable computer that is capable of reading the secure memory device; coupling the secure memory device and the lock box in such a way so as to permit communication between the secure memory device and the lock box through the communications link; storing lock box configuration data and storing secure compartment access code data in the secure memory device through the communications link; de-coupling the secure memory device from the lock box; and coupling the secure memory device to the portable computer, reading the secure compartment access code data, and conditionally revealing the secure compartment access code data to a human user.

In accordance with a further aspect of the present invention, a method of operating an electronic lock box system is provided, in which the method comprises the steps of: providing an electronic lock box with a secure compartment therein and a shackle for attachment to a fixed object; providing a mobile communications device; providing a central clearinghouse computer at a remote location from the electronic lock box; establishing a communication link between the mobile communications device and the central clearinghouse computer; transmitting to the central clearinghouse computer unique identification information about the electronic lock box and unique identification information about a user requesting access to the electronic lock box; and conditionally transmitting from the central clearinghouse computer a secure compartment access code data to the mobile communications device.

In accordance with yet a further aspect of the present invention, a method of maintaining an electronic lock system's synchronization of time-refreshed progressive security access codes is provided, in which the method comprises the steps of: providing a central clearinghouse computer at a remote location, a first computer at an electronic lock, an ambient temperature sensor at the electronic lock, and a clock oscillator circuit having a known temperature drift coefficient at the electronic lock; reading an ambient temperature at predetermined regular intervals using the ambient temperature sensor; accumulating clock oscillator time drift, based on a plurality of electronic lock ambient temperature values taken at predetermined time intervals; generating a first plurality of time-refreshed progressive security access codes at the first computer; generating a second plurality of time-refreshed progressive security access codes at the central clearinghouse computer; and adjusting a rate of new access code computation at the first computer using the accumulated clock oscillator time drift, to maintain synchronization between the first plurality of time-refreshed progressive security access codes and second plurality of time-refreshed progressive security access codes.

In accordance with still a further aspect of the present invention, an electronic lock box system is provided, comprising: an electronic lock box attached to a fixed object, the lock box comprising: a first electrical power source, a first processing circuit, a first memory circuit, a first communications port, an ambient temperature sensor, and a secure key compartment; a portable computer comprising: a second electrical power source, a second processing circuit, a second memory circuit, and a second communications port; the first processing circuit, first memory circuit, and first communications port are configured to exchange data with a secure memory device; and the second processing circuit, second memory circuit, and second communications port are configured to exchange data with the secure memory device, and are further configured to restrict access to the key compartment by conditionally revealing a lock box access code.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 2 is an illustrative memory map of the EEPROM of the lock box of FIG. 1.

FIG. 14 is an illustrative memory map of the secure memory card used in the present invention.

DETAILED DESCRIPTION OF THE PREFERRED EMBODIMENT

Figure 1:
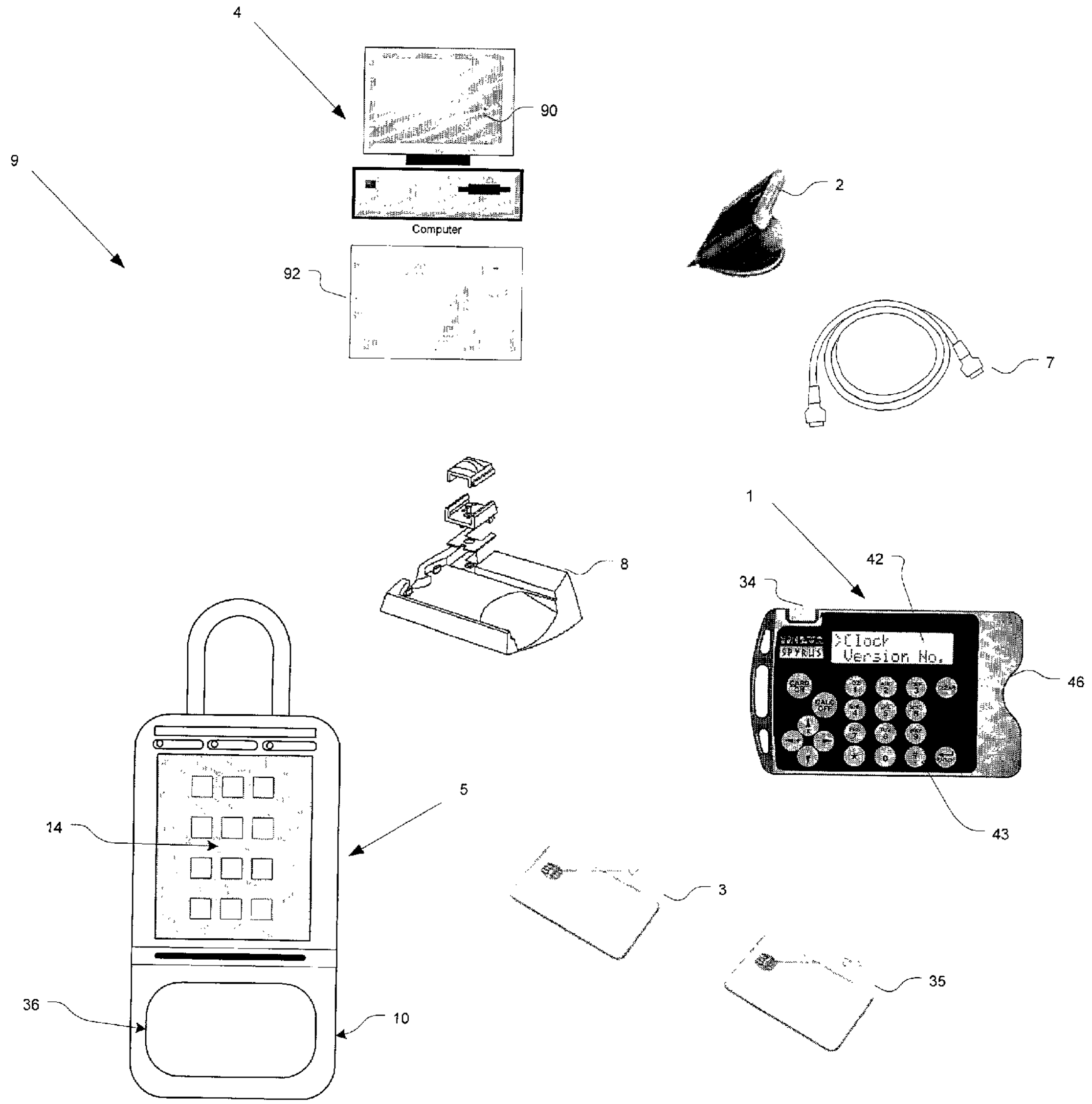
FIG. 1 is a diagrammatic view of the major components of a portable lock box security system, as constructed according to the principles of the present invention.

Reference will now be made in detail to the present preferred embodiment of the invention, an example of which is illustrated in the accompanying drawings, wherein like numerals indicate the same elements throughout the views.

The present invention supports two distinct lock box access methodologies. The first methodology uses a system of conditional access code that are disclosed to the user for controlling lock box key compartment access. The access code is conveyed securely from the lock box to a portable computer via a secure memory device (also referred to as a "secure memory card"); moreover, the access code is generated as a random number (by the lock box) and is generated in real time as the attempted access is in progress. Depending on expiration status and other factors, the portable computer determines whether the lock box access code should be revealed to the user.

The main security aspect of the system (of this first methodology) relies upon randomly-generated lock box access codes that are good for only a single key compartment access operation that occurs within a highly limited time window. Such an access code automatically expires whether used or unused, thus making the system highly secure. Furthermore, the access code is only revealed to a user who has an active identification (ID) card, which contains random access memory (RAM) that receives the access code from the lock box through a card plug-in module. This ID card will also be referred to herein as a "secure memory card" or a "smart card."

The user removes the ID card from the lock box card plug-in module and now inserts the ID card into a small portable computer. If the user's ID card has expired, the portable computer will not display the necessary lock box access code information. If the ID card has not expired, the portable computer will display the access code information after the user enters a secret personal identification code. After the lock access code has been delivered to the user, the code is entered on the lock box by pressing keys on the lock box's integral keypad.

In a preferred embodiment disclosed below, the portable computer comprises a "smart card" (as it is commonly known) computer system, which contains a microcomputer and associated memory, as well as a liquid crystal display (LCD) that communicates information to the user. This first methodology is advantageous as it eliminates the bulky and expensive electronic key found in conventional systems used at the present time. The user only has to carry a credit card-sized smart card for identification to the lock system.

The second methodology of access control involves the use of mobile communication technology, a central clearinghouse computer, and regularly changing access codes in the lock box in which the lock box's access codes change at regular time intervals to ensure security. The progression of access codes is governed by a algorithmic system known to both the lock box and central clearinghouse computer. The lock box employs a temperature compensated clock oscillator to ensure time synchronization of both the lock box and central clearinghouse computer. Delivery of the access code in this method can be done through virtually any mobile communication technology available, including cellular phone via synthesized voice, numeric and alphanumeric pager, and a wireless Internet connection. After the lock access code has been delivered to the user, the code is entered on the lock box by pressing keys on the lock box's integral keypad. This method is advantageous as it also eliminates the bulky and expensive electronic key found in conventional systems used at the present time. The user only has to carry a credit card-sized "smart card" for identification to the lock system (and the memory on the smart card is not really used—the user merely needs to know his or her card's ID number and his or her PIN).

Some of the additional operational features of the present invention are as follows:

(1) the ability to control delivery of the lock access code based on time of day, day of week, association membership, agent's personal identification code, and active agent status.

(2) the ability to configure a lock box to only be accessible with a combination of access code and listing agent showing by appointment code.

(3) the ability to deliver home showing instructions prior to delivery of the access code to the real estate professional.

(4) the ability to use a widely available mobile phone, or mobile Internet connection, to retrieve a lock access code.

(5) the ability to update the lock box operating software so as to introduce new features and functionality over the operating life of the system.

Some of the general construction features of the present invention are as follows:

(1) a radically simpler design as compared to conventional portable electronic key lock systems, with a lower parts count, thus making the device less costly to manufacture.

(2) the utilization of "off the shelf" smart card technology, thereby further lowering the cost of delivery to the end user.

(3) a significantly smaller and more convenient device for the real estate professional to carry as compared to conventional portable electronic key lock systems. The traditional "bulky" electronic key is replaced with a credit card-sized portable computer.

Referring now to the drawings, FIG. 1 shows a lock box system, generally designated by the reference numeral 9, as constructed according to the present invention. The system 9 includes one or more lock boxes 5, secure memory cards 3, portable computer devices 1, personal computers or workstations 4, and PC "smart card" readers 2. Lock box 5 contains a door key to the dwelling (e.g., a house or condo) and is attached to a fixed object (e.g., a door knob) proximal to the dwelling via a lock box shackle 6. The secure memory card 3 is used by the individual (e.g., a real estate agent) desiring access to the dwelling or home as an identification mechanism, as well as a secure transport medium to exchange information with the portable computer device 1.

Figure 9:
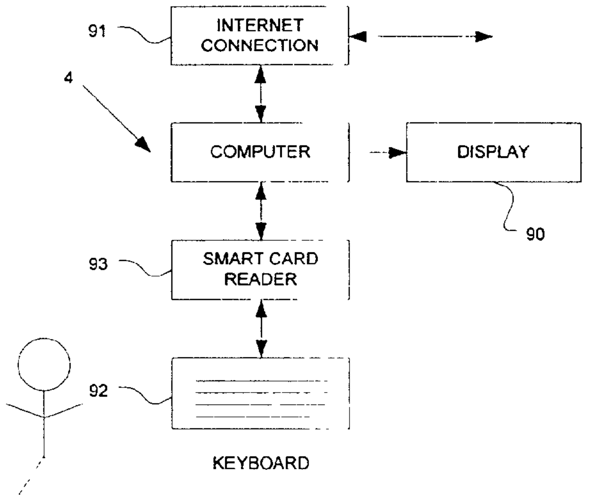
FIG. 9 is a schematic block diagram of a personal computer system used in a realtor's office as part of the portable lock box security system of FIG. 1.

In general, lock box access code information disclosed (e.g., displayed) by the portable computer device 1 is used by the user to gain access to the key compartment of the lock box 5. The secure memory card 3 can also be used by a user to download access log data from the lock box 5 (which has been stored in a memory device in the lock box) for future processing by the user on an "office" computer 4 (which could be virtually any type of PC-style personal computer or workstation). This office computer 4 has an associated display monitor 90 and keyboard 92 (see FIG. 9), and typically would be placed in a realtor's office.

The portable computer device 1 includes the capability to interface to a cradle 8 that holds a cable connector 34 that is used to connect the portable computer 1 to the office computer 4 through a serial data cable 7. The PC smart card reader 2 is typically used in high traffic locations, such as offices where frequent updating of the secure memory card 3 is necessary or desirable. The office computer 4 is used to communicate with a central clearinghouse computer system (not shown) via the Internet, or other network, to manage the information flow between the portable computer device 1, secure memory card 3, and in some instances through PC smart card reader 2.

Figure 6:
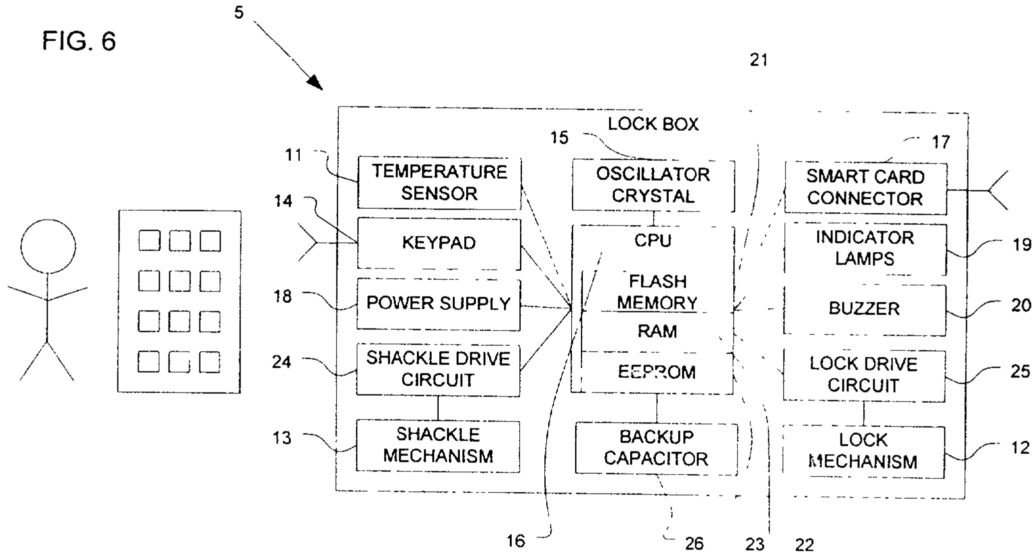
FIG. 6 is a schematic block diagram of a lock box used in the portable lock box security system of FIG. 1.

Description of Lock Box:

The electronic circuitry of lock box 5 is illustrated in block diagram form in FIG. 6. Lock box 5 includes a microprocessor (CPU) 16, FLASH memory 21, random access memory (RAM) 22, EEPROM (electrically erasable programmable read only memory) 23, a battery (or other electrical power supply) 18, a memory backup capacitor 26, an ISO-7816 smart card connector 17, indicator LED lamps 19, a piezo buzzer 20, a crystal oscillator 15, a digital temperature sensor 11 (these last two devices can be combined into a single chip—see, e.g., the chip 37 on FIG. 3) a shackle drive circuit 24, a shackle release mechanism 13, a key compartment mechanism drive circuit 25, a key compartment lock/release mechanism 12, and a membrane style keypad 14 for user data entry.

Microprocessor 16 controls the operation of the lock box 5 according to programmed instructions (lock box control software) stored in a memory device, such as in FLASH memory 21. RAM memory 22 is used to store various data elements such as counters, software variables and other informational data. EEPROM memory 23 is used to store more permanent lock box data such as serial number, configuration information, and other important data. It will be understood that many different types of microprocessors or microcontrollers could be used in the lock box system 5, and that many different types of memory devices could be used to store data in both volatile and non-volatile form, without departing from the principles of the present invention. In one mode of an exemplary embodiment, the lock box CPU 16 is an 8-bit Atmel Mega8 microcontroller that incorporates RAM 22, FLASH memory 21 and EEPROM memory 23 internally (as on-board memory).

Battery 18 provides the operating electrical power for the lock box. Capacitor 26 is used to provide temporary memory retention power during replacement of battery 18. It will be understood that an alternative electrical power supply could be used if desired, such as a solar panel with the memory backup capacitor.

Lock box 5 includes a shackle 6 that is typically used to attach the box 5 to a door handle or other fixed object. Lock box 5 also includes a key compartment 10 which typically holds a dwelling key (not shown), and which can be accessed via a key access door 36 (which is also referred to herein as a "controlled access member").

The key compartment lock and release mechanism 12 uses a gear motor mechanism 38 that is controlled by drive circuit 25 that in turn is controlled by CPU 16. Shackle release mechanism 13 also uses a gear motor (in this embodiment, the same gear motor 38), which is controlled by drive circuit 24 that in turn is controlled by CPU 16. It will be understood that the release or locking mechanisms used for the shackle 6 and key compartment 10 can be constructed of many different types of mechanical or electromechanical devices without departing from the principles of the present invention.

The crystal oscillator 15 provides a steady or near-constant frequency (e.g., at 32.768 kHz) clock signal to CPU 16's asynchronous timer logic circuit. The ISO-7816 smart card connector 17 connects to smart card contacts 33 to allow the exchange of data between the lock box's CPU 26 and the memory devices 31 in the smart card 3 (discussed below in greater detail).

In one embodiment, the digital temperature sensor 11 is read at regular intervals by the lock box CPU 16 to determine the ambient temperature. Crystal oscillator 15 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal 15 and thus compensating for the drift and allowing precise timing measurement regardless of lock box operating environment temperature. As noted above, a single chip can be used to replace the combination of crystal oscillator 15 and temperature sensor 11, such as a part number DS32 KHZ manufactured by Dallas Semiconductor, generally designated by the reference numeral 37 on FIG. 3.

The shackle drive circuit 24 and lock drive circuit 25 are configured as H-bridge circuits with low on-resistance MOSFET drivers. The H-bridge allows current to be controlled in both directions, thus allowing drive current to be reversed as necessary to shackle gear motor mechanism 12, and key compartment gear motor lock mechanism 13. In one embodiment of the present invention, a single motor can thereby be used to operate both the shackle gear motor mechanism 12, and key compartment gear motor lock mechanism 13.

LED indicator lamps 19 and a piezo buzzer 20 are included to provide both an audible and a visual feedback of operational status of the lock box 5. Their specific uses are described in detail below.

Backup capacitor 26 is charged by battery 18 (or perhaps by another power source) during normal operation. Capacitor 26 serves two functions, the first of which is to maintain adequate voltage to CPU 16 during either shackle drive circuit activation, or lock drive circuit activation. In an exemplary embodiment, capacitor 26 is charged from the regulated side of voltage regulator in power supply 18, whereas all electromechanical drive current is derived from the unregulated side of power supply 18. Capacitor 26 also maintains a stable voltage to CPU 16 during periods of high current drain on power supply 18. The second function of capacitor 26 is to maintain CPU 16 operation and RAM memory 22 during a period when the battery 18 is replaced.

Figure 3:
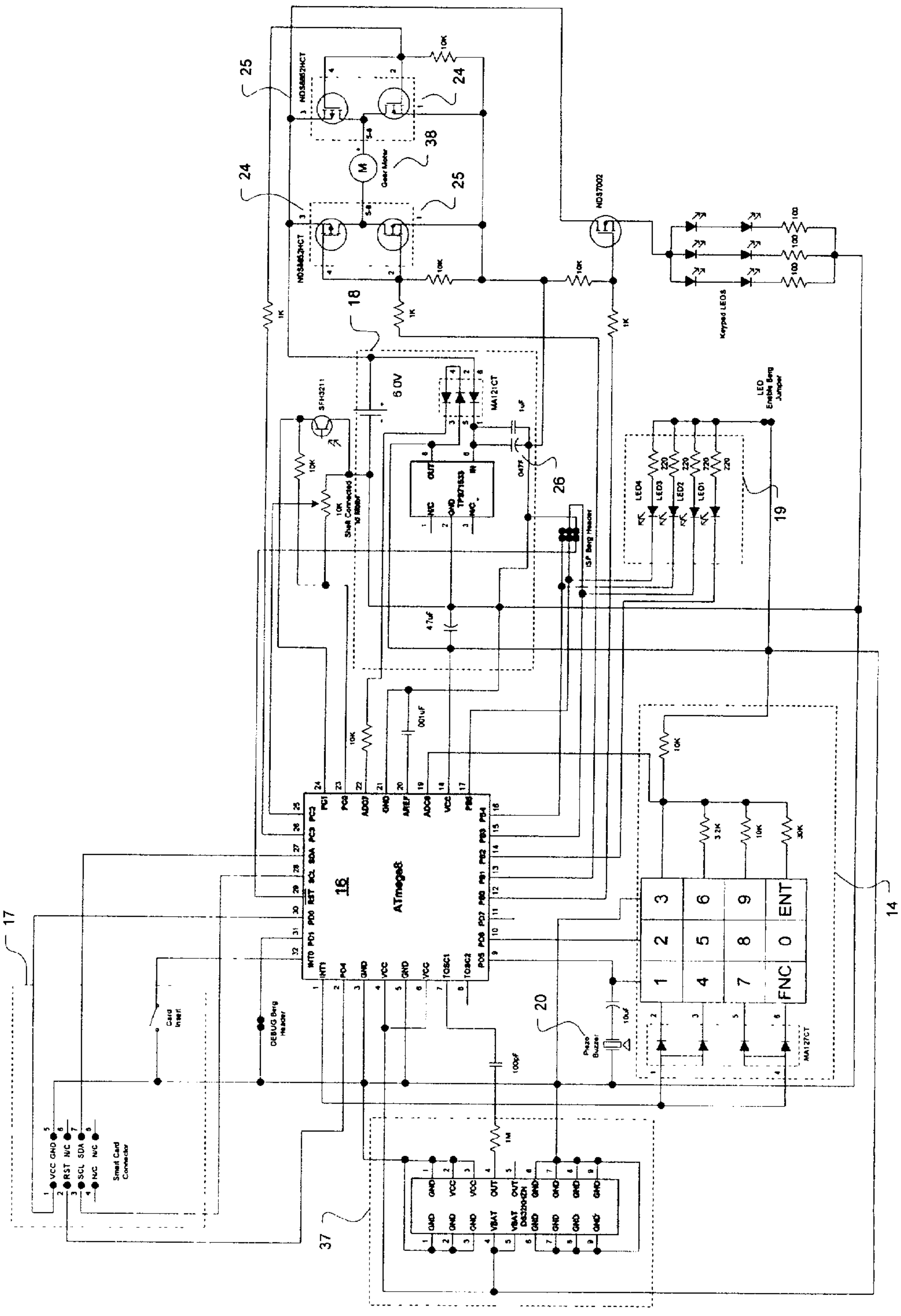
FIG. 3 is an electrical schematic diagram of the lock box of FIG. 1.

An exemplary electronic circuit for lock box 5 is illustrated as a schematic diagram in FIG. 3, which corresponds to the block diagram of FIG. 6. The major circuit portions are designated by the same reference numerals as indicated above in the discussion of FIG. 6. Additional information is provided below in the form of a parts list for FIG. 3, as follows:

| Qty. | Description | Manufacturer | Part Number |
|---|---|---|---|
| 2 | MOSFET Half Bridge | Fairchild | NDS8852HCT |
| 1 | N-MOSFET | Fairchild | NDS7002 |
| 1 | 3.3 Volt Regulator | Texas Inst. | TPS71533 |
| 1 | 32KHZ TXCO | Maxim | DS32KHZN |
| 1 | Microcontroller | Atmel | ATmega8 |
| 1 | Smart Card Connector | ITT Cannon | CCM04-1889 |
| 1 | Membrane Keypad | EECO Switch | Custom |
| 1 | Gear Motor | Sanyo | 5A127NA45 |
| 1 | .047F Cap | Panasonic | EEC-F5R5U473 |
| 1 | Piezo Buzzer | muRata | PKM13EPY-4002 |
| 1 | Phototransistor | Osram | 5FH3211 |
| 1 | Quad Switching Diode | Panasonic | MA127CT |
| 1 | Triple Switching Diode | Panasonic | MA112CT |
| 1 | Potentiometer | Piher | PC-16 |
| 6 | 10K Ohm Resistors | Panasonic | |
| 2 | 1K Ohm Resistors | | |
| 1 | 3.2K Ohm Resistor | | |
| 1 | 30K Ohm Resistor | | |
| 1 | 1 M Ohm Resistor | | |
| 2 | 220 Ohm Resistor | | |
| 1 | 10 uF Capacitor | | |
| 1 | 4.7 uF Capacitor | | |

-continued

| Qty. | Description | Manufacturer | Part Number |
|---|---|---|---|
| 1 | 100 pF Capacitor | | |
| 1 | .1 uF Capacitor | | |
| 1 | .001 uF Capacitor | | |
| 3 | Red SMT LED | LiteON | LTSTC191KRKT |
| 6 | Yellow SMT LED | LiteON | LTSTC191KSKT |

It will be understood that the exact part numbers and manufacturers of exemplary circuit of FIG. 3 may be deviated from while nevertheless falling within the principles of the present invention. Most (or all) of the components are available from more than one manufacturer with full compatibility maintained.

Lock Box Configuration Data:

Lock box 5 stores lock access configuration data in EEPROM memory 23. This lock access configuration information is initially stored in a memory 31 of the secure memory card 3 (see FIG. 5), and is copied from the card 3 to the EEPROM 23 when “smart card” contacts 33 of the secure memory card 3 are coupled with the ISO-7816 “smart card” connector 17 of the lock box 5 (see FIG. 6).

An illustrative memory map of the lock box EEPROM 23 is provided in FIG. 2. The lock box serial number is a permanently assigned device identification datum that is written only once to EEPROM memory 23. In the present invention, the lock box memory devices are merely a repository for configuration data that will ultimately be transferred to the portable computer 1 for processing under appropriate circumstances.

Lock Box Access Log:

Lock box 5 tracks and stores in RAM 22 a “recent” historical list of secure memory card serial numbers connected to the lock box. In one mode of the invention, the historical list stored in RAM 22 comprises the most recent sixty-four (64) secure memory card serial numbers that were connected to the lock box which resulted in a user entering the correct access code into keypad 14. Once the CPU 16 determines all sixty-four positions are filled, the contents of the access log in RAM memory 22 are transferred by CPU 16 to the EEPROM 23 and the log contents in RAM 22 are cleared by CPU 16. This utilization of memory creates allows for efficient use of CPU 16’s memory resources and an access log capable of storing 128 entries (it essentially can act as a first in-first out, or FIFO, register or memory device).

Figure 4:
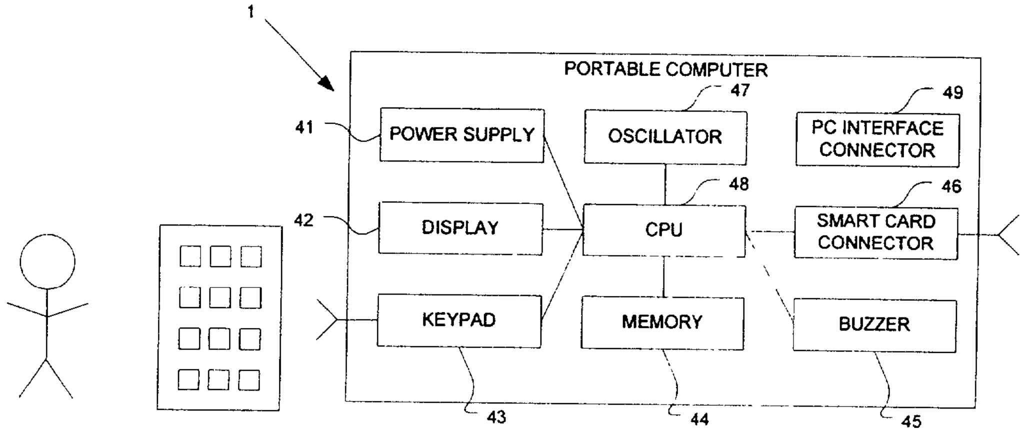
FIG. 4 is a schematic block diagram of a portable computer used in the portable lock box security system of FIG. 1.

Description of Portable Computer and Portable Computer Cradle:

The hardware circuitry of portable computer device 1 is depicted in block diagram form in FIG. 4. The portable computer device 1 includes a battery (or other type of electrical power supply) 41, a 12-character, 2-line LCD display 42, a keypad 43, a memory circuit 44, a piezo buzzer 45, an ISO-7816 “smart card” connector 46, a crystal oscillator 47, and a microprocessor (CPU) 48. In an exemplary embodiment of the present invention, the portable computer is a model number PAR2 manufactured by Spyrus Incorporated; however, it will be understood that any suitably equipped and appropriately programmed portable computer with an ISO-7816 smart card connector could be substituted for the above-cited model and manufacturer. Such alternative possibilities include palm top computers and more advanced cell phones.

Portable computer 1 is manufactured with a cradle connector interface 8 that facilitates connection of the portable computer 1 to a personal computer (PC) or workstation 4, typically via either an RS-232 interface or a USB interface. The cradle 8 holds portable computer 1 in a position where interface cable 7 can connect reliably to PC interface connector 49.

Figure 13:
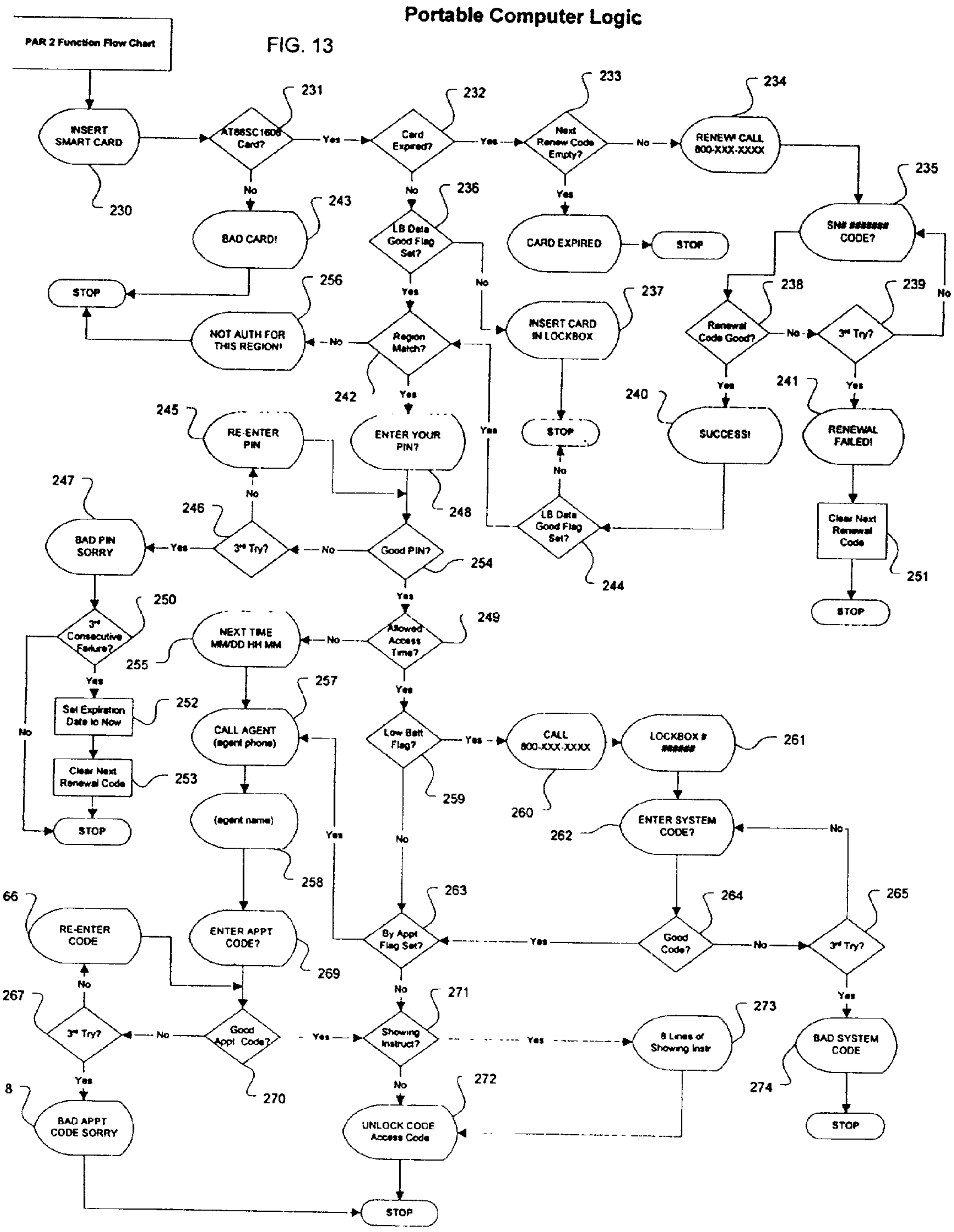
FIG. 13 is a flow chart showing some of the important logical operations performed by the portable computer of FIG. 1.

The portable computer 1 performs various functions involved with the delivery of access code information to the user. FIG. 13 shows a detailed flow chart of the operations performed by the CPU 48 in conjunction with display LCD 42, keypad 43, and smart card connector 46. Further detail of this operation is supplied below.

Figure 5:
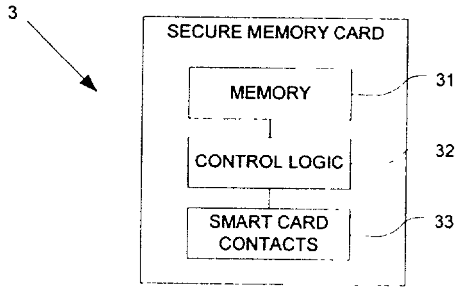
FIG. 5 is a schematic block diagram of a secure memory card used in the portable lock box security system of FIG. 1.

Description of Secure Memory Card:

The secure memory card 3 used in an exemplary embodiment of the present invention is model AT88SC1608, manufactured by Atmel Corporation. The secure memory card 3 is an ISO-7816 "smart card" device that is tamper resistant via several security features. This card 3 incorporates control logic 32 to prevent unauthorized access by use of an Atmel proprietary challenge response system, as well as password-controlled access to memory 31 storage areas. The card 3 acts as a secure data exchange medium to ensure lock system security is not compromised by unauthorized tampering or disclosure of lock access codes. FIG. 5 provides a schematic block diagram of the major integral components of secure memory card 3.

The secure memory card mainly consists of EEPROM-type memory with additional control logic that allows controlled access to the EEPROM memory contents. The control mechanism consists of two types of security: the first type consists of password control to each of the secure memory cards memory "pages". Each page can be protected with a read password and a write password. The second type of security is a challenge response mechanism or an "anti-wiretapping" mechanism that incorporates a cryptographic function to prevent unauthorized access to the card memory contents. These security mechanisms provide flexible and robust security to control read and write access to memory. An exemplary memory map of the card's contents is depicted in FIG. 14. Further details of the operation of secure memory card 3 are discussed below.

Figure 7:
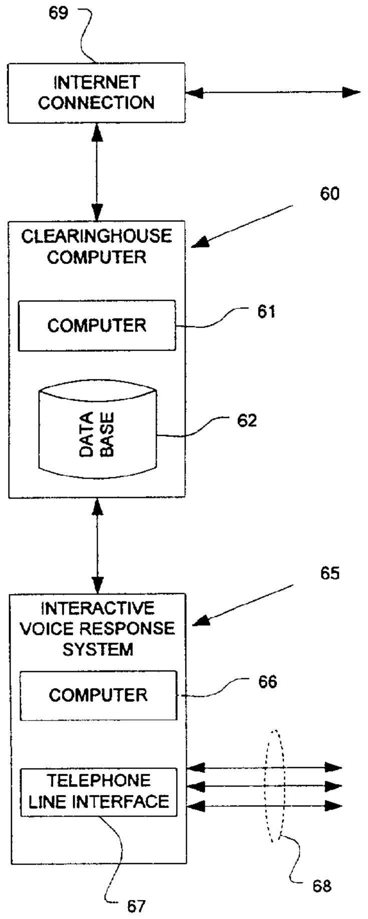
FIG. 7 is a schematic block diagram of some of the major components of an interactive voice response (IVR) system according to another aspect of the present invention.

Description of Clearinghouse Computer and Interactive Voice Response System:

A central "clearinghouse" computer system, generally designated by the reference numeral 60, is provided in an exemplary embodiment of the present invention, and is depicted in schematic block diagram form in FIG. 7. This computer system 60 contains one or more computer processors 61, and a database 62 which contains data regarding operation of the system 60. The central clearinghouse computer system 60 is connected to the Internet at a physical connection 69, and to an interactive voice response (IVR) system 65. These systems exchange data during the operation of the lock box system.

The interactive voice response system 65 contains one or more computer processors 66, and one or more telephone line interfaces 67. The telephone line interfaces 67 connect to a plurality of physical telephone circuits 68. The operation of these systems is discussed below in greater detail.

Description of Lock Box System Operation

The operation of the lock box system encompasses many different tasks and operating modes. Each is described in detail below.

Figure 11:
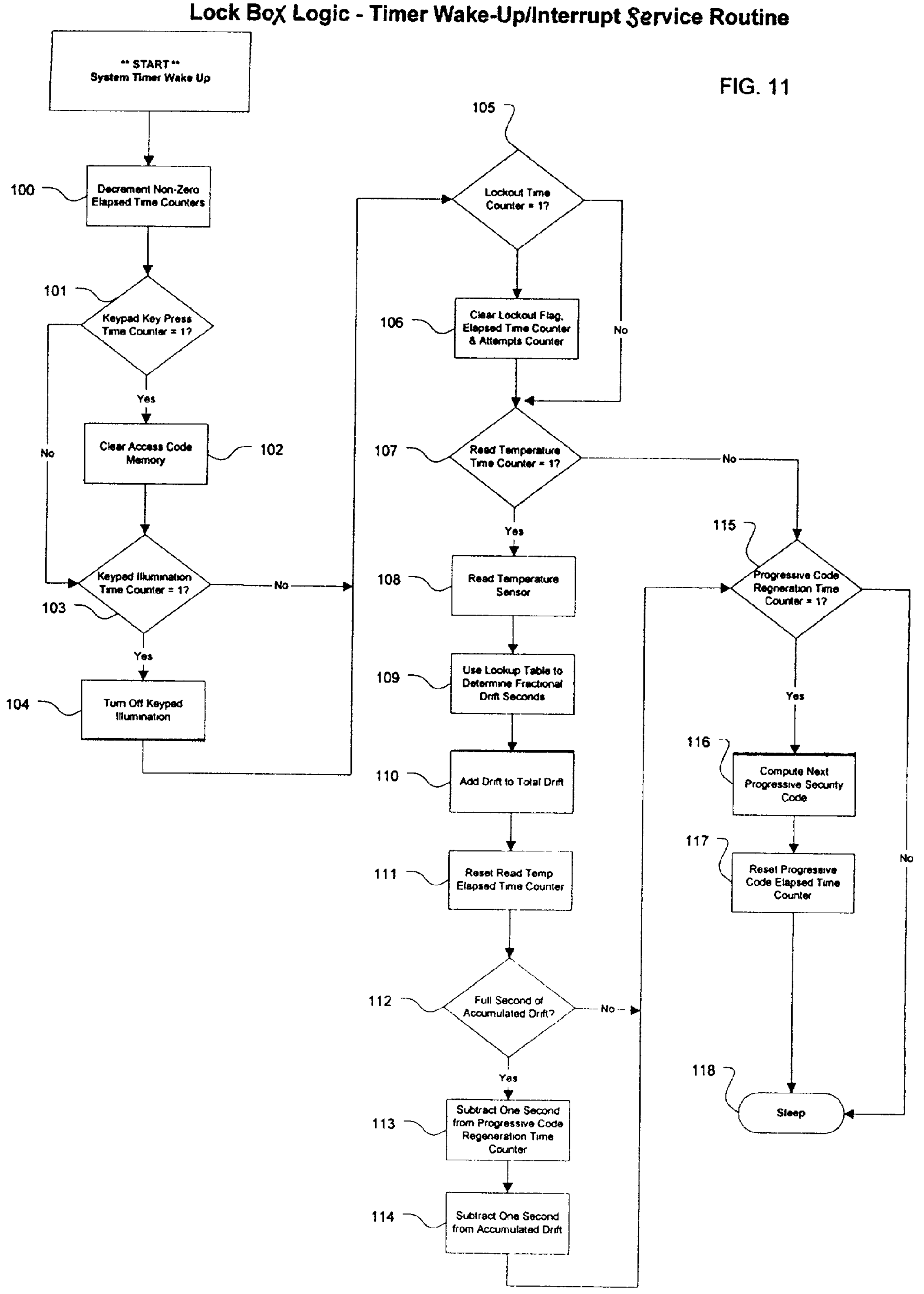
FIG. 11 is a flow chart showing some of the important logical operations performed when an asynchronous timer in the lock box of FIG. 1 operates.

Description of Lock Box Timer Wakeup:

Within lock box 5, the crystal oscillator 15 generates regular wake-up periods for CPU 16. During these wake-up periods, a software interrupt service routine activates and performs a number of time-dependent tasks, as described in a flow chart on FIG. 11. Upon CPU 16 waking from sleep mode, a series of timed counters are decremented at a step 100 if they are at a non-zero value. At a decision step 101, a keypad key press counter is checked to see if it has reached a value of one (1). If so, the access code memory (in RAM 22) is cleared at a step 102. This prevents previously-entered but not immediately-used access codes from being recognized after being entered at the keypad 14, which improves security since the access codes expire after a predetermined amount of time; this feature also eliminates partially-entered access codes from the access code memory.

A decision step 103 now tests to see if a keypad illumination counter (not shown in FIG. 6) has reached a value of one (1). If not, the logic flow proceeds to a decision step 105. On the other hand, if the result was YES at decision step 105, a set of keypad illumination LEDs (not shown of FIG. 6) are turned off to conserve power at a step 104.

The logic flow now reaches decision step 105, in which it is determined if a "lockout counter" (not shown in FIG. 6) value is equal to one (1). The lockout count is determined by CPU 16 in response to too many incorrect access code attempts by the user. If the counter value is one (1), the lockout condition is cleared, and an "attempts counter" (not shown in FIG. 6) and a "key press time counter" (not shown in FIG. 6) are both cleared at a step 106. If the lockout counter value is not set to one (1), then the logic flow proceeds to a decision step 107.

At decision step 107, CPU 16 evaluates a "temperature compensation time counter" (not shown in FIG. 6) to see if its value is one (1), which will occur at predetermined constant time intervals. If false (i.e., zero (0), or other non-1 value), the logic flow proceeds directly to a decision step 115. If the condition is true (i.e., one (1)), CPU 16 initiates a procedure to read temperature sensor 11 to determine the ambient lock box temperature at a step 108. CPU 16 takes the temperature reading from step 108 and initiates a lookup process at a step 109 to a compensation table (not shown in FIG. 6) located in lock box FLASH memory 21, thereby determining "fractional drift seconds," which can vary as the ambient temperature changes. This fractional drift seconds variable enables the lock box to keep track of the "time drift" (of the crystal oscillator) that is due to ambient temperature not always being a constant value. At each time interval upon reaching step 107, the "time drift" value is saved for time amounts that are less than one second. This "time drift" value is found the lookup table (i.e., the compensation table), and is added to the "accumulated drift," which is stored in RAM 22, at a step 110. CPU next resets a "temperature read counter" (not shown in FIG. 6) at a step 111.

CPU 16 then computes at a decision step 112 whether the accumulated drift (from the calculation of step 110) is greater than or equal to one second. If the answer is false (or NO), the logic flow proceeds directly to step 115. If the answer is true (or YES), then CPU 16 subtracts one second at a step 113 from a "progressive code regeneration time counter" and also subtracts at a step 114 one full second from the accumulated drift value. The remainder of any fractional drift is left in the accumulated drift value. This series of temperature compensation steps ensures close synchronization with the central clearinghouse computer 60 generation of progressive access codes, when using a crystal clock oscillator that is not internally compensated for temperature variations.

The progressive security code algorithm generates a pseudo random number sequence based on as a given (predetermined) "seed value." A given seed value always returns the same sequence of pseudo random numbers although the numbers themselves are uniformly distributed and do not follow a discernible pattern. The access codes generated are highly secure because, without knowing the exact algorithm and seed, it is nearly impossible to predict the next number in the sequence. A well known embodiment of this type of algorithm called a "linear congruential random number generator".

In the present invention, lock box 5 and clearinghouse computer 60 synchronize time counters and random number seeds upon the programming of the lock box. After each regularly occurring time interval, lock box 5 and clearinghouse computer 60 each compute the next pseudo random number in the sequence. As both lock box 5 and clearinghouse computer 60 contain highly accurate timing means, the two devices generate equivalent codes at the nearly exactly the same moments in time.

At decision step 115, CPU 16 determines whether or not a "progressive code regeneration time counter" is set to a value of one (1). If false (i.e., its value is zero (0), or other non-1 value), CPU 16 is put into its sleep mode at a step 118. If true (i.e., its value is one (1)), CPU 16 computes the next progressive security code at a step 116 based upon a shared algorithm between lock box 5 and central clearinghouse computer 60. A step 117 resets the progressive code update time counter, and the CPU 16 then enters sleep mode at step 118.

Figure 10:
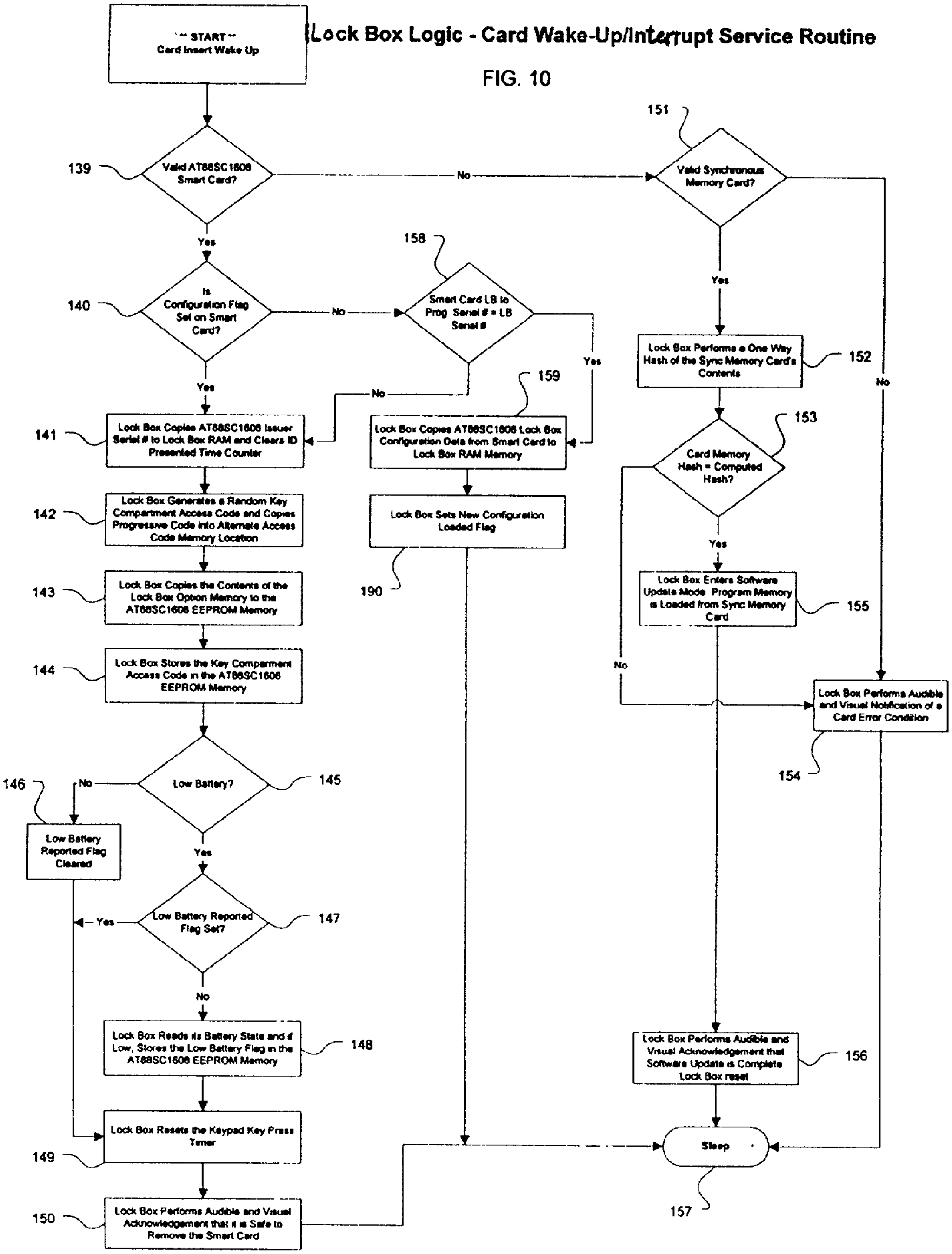
FIG. 10 is a flow chart showing some of the important logical operations performed when the secure memory card is inserted in the lock box of FIG. 1.

Description of Lock Box Smart Card Insertion Wakeup:

Upon insertion of the secure memory card 3 into the smart card connector 17 of lock box 5 ("coupling" the card to the lock box), CPU 16 exits sleep mode and begins an interrupt service processing routine described in a flow chart on FIG. 10. CPU 16 performs a card cryptographic challenge response authentication procedure in a decision step 139. If the challenge step is unsuccessful at step 139, the logic flow is directed to a decision step 151 to handle a communications interchange with a synchronous-type memory card.

The challenge step 139 mainly determines whether or not the secure memory card 3 was manufactured by Atmel Corporation, and if the card is a model AT88SC1608. In an exemplary embodiment of the present invention, step 139 also verifies that the correct "card issuer identification" is stored on secure memory card 3

A successful result of the challenge response process of decision step 139 results in the logic flow next proceeding to a decision step 140 where the CPU 16 checks to see if a "new lock box configuration flag" is set in the memory 31 of the secure memory card 3. If this flag is not set, then the logic flow proceeds to a decision step 158. Alternatively, if the flag is set, then CPU 16 begins reading information stored in memory 31 of the secure memory card 3 at a step 141; this memory contains the "serial identification number" of secure memory card 3. In step 141, the card issuer serial number is copied to the RAM 22 of lock box 5, and an "ID presented time counter" is cleared.

CPU 16 now generates a random lock box access code at a step 142, and copies the current progressive access code stored in RAM 22 of the lock box 5 to an alternate location in RAM 22. This is to ensure that, if the progressive code regeneration cycle occurs during lock access steps, the access code will not change until after completion of the lock access attempt. CPU 16 then uploads the lock box configuration data stored in EEPROM 23 memory 23 (also referred to herein as the contents of the "lock box option memory") of lock box 5 to secure memory card memory 31 (EEPROM) at a step 143, and CPU 16 also stores the recently-generated random lock access code data into memory 31 (EEPROM) of secure memory card 3 at a step 144.

Next, CPU 16 checks the status of the battery voltage on battery 18 at a decision step 145 to determine if the voltage has fallen below a predetermined safe operating threshold. If the battery 18 voltage is within acceptable limits, a "low battery reported" flag in RAM 22 memory is cleared at a step 146. If the battery voltage is low, CPU 16 next checks if the low battery reported flag is set at a decision step 147. If the flag was cleared, then it is set and the flag is stored by CPU 16 in memory 31 of secure memory card 3. In this manner, the above sequence of steps causes the low battery reported flag to be set on the non-volatile EEPROM of secure memory card 3, if no other reporting of low battery has occurred. This eliminates the need for multiple reporting of the same low battery condition for a given lock box 5.

At a step 149, CPU 16 resets the keypad 14 "key press timer" (not shown in FIG. 6) to start the "count down timer" (not shown in FIG. 6) to wait for access code entry. Next at a step 150, the lock box 5 provides a distinct illumination pattern of LED indicator lamps 19 and produces a unique audible sound though buzzer 19 to indicate that the user should remove the secure memory card 3 from the smart card connector 17 of lock box 5.

If the secure memory card test of decision step 139 fails (i.e., indicates a NO result), this indicates that perhaps an alternative type of smart card has been inserted into the smart card connector 17 of lock box 5 (such as a "synchronous memory card" 35, depicted on FIG. 1). CPU 16 determines if the inserted smart card is of a type having synchronous memory at a decision step 151, and if so, the logic flow proceeds to a step 152 where CPU 16 reads the data on this synchronous memory card 35, and performs a cryptographic hash on the contents, utilizing a secret hash seed. CPU 16 then compares the generated hash result with the hash result retrieved from the synchronous memory card 35 at a decision step 153. Synchronous memory card 35 is also referred to herein as a "portable memory device" or a "portable memory card," and generally comprises EEPROM and an $I^2C$ serial port.

If there is a match, CPU 16 begins executing program code to perform a software update to the FLASH memory 21 of lock box 5 at a step 155, and data is read from synchronous memory card 35 and copied to FLASH memory 21 of the lock box. Next, lock box 5 provides a distinct illumination pattern of LED indicator lamps 19 and produces a unique audible sound though buzzer 19 at a step 156, thereby indicating that the user should remove the synchronous memory card 35 from smart card connector 17 of lock box 5. CPU 16 then initiates a "lock box reset" to activate the newly installed software now stored the memory of lock box 5. Lock box 5 now returns to its sleep mode at a step 157. The above steps facilitate a highly desirable feature in which improvements to the functionality of lock box system software can be easily made during the life of the lock box system 9.

If the result at decision step 153 was NO, then the lock box 9 presents a visual indication using LED lamps 19 and an audible indication using buzzer 19 to inform the user that a "card error condition" exists, at a step 154. After this occurs, the lock box 5 returns to its sleep mode at a step 157. It will be understood that the card 3 is removed from the smart card connector 17 at this point, which is referred to as "de-coupling" or "disengaging" the memory card.

Decision step 158 is a continuation of processing when the "new lock box configuration flag" is set on the secure memory card 3. In this state, CPU 16 reads the configuration serial number stored in memory 31 of the secure memory card 3 and compares the number to the serial identification number in EEPROM 23 of lock box 5. If the two serial numbers do not match, then the logic flow is directed to step 141. Otherwise (i.e., the numbers match), CPU 16 reads the "new lock box configuration information" and stores this data in RAM 22 of lock box 5 at a step 159. CPU 16 next sets a "new lock box configuration loaded flag" at a step 190, and CPU 16 then enters sleep mode at step 157. The configuration data stored in RAM 22 will be later transferred to the EEPROM 23 of lock box 5 upon a proper key sequence entry on the keypad 14 of lock box 5. This function is described below in greater detail.

Figure 12:
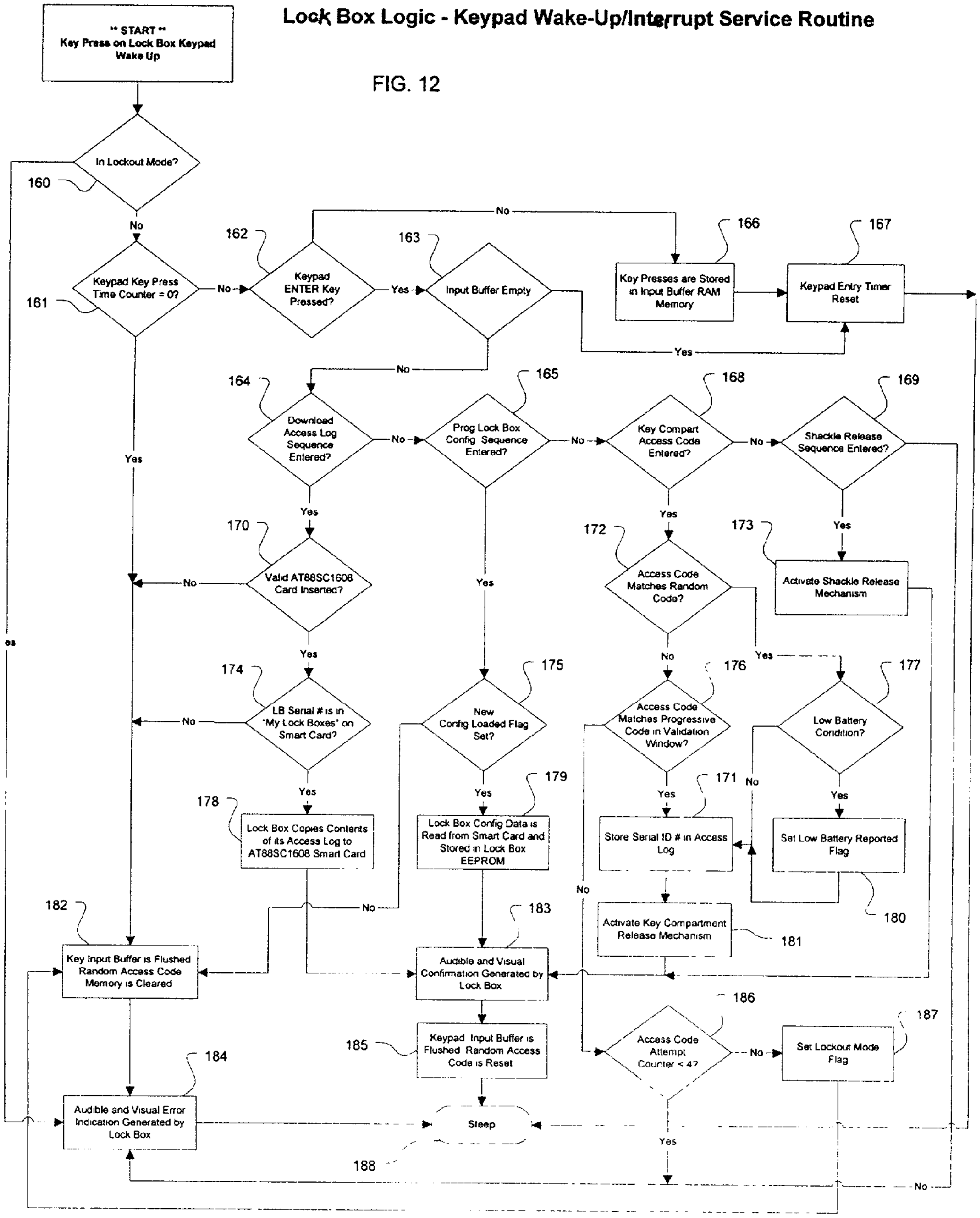
FIG. 12 is a flow chart showing some of the important logical operations performed when a key is pressed on the lock box of FIG. 1.

Description of Lock Box Key Press Wakeup:

FIG. 12 is a flow chart which depicts logic steps performed by CPU 16 as it wakes from sleep mode when a key is pressed on keypad 14 of lock box 5. Pressing a key on the keypad 14 causes buzzer 19 to emit a momentary chirp sound to provide audible feedback to the user, indicating key contact was made. At a decision step 160, CPU 16 reads the lockout mode flag stored in RAM 22, and if the flag is set, the logic flow is directed to a step 184 in which lock box 5 provides a distinct illumination pattern of LED indicator lamps 19 and produces a unique audible sound though buzzer 19 to indicate that lock box 5 is currently locked out from operation for a predetermined period of time. The lockout mode is reached through steps 164, 165, 168, or 169, as described below. CPU 16 then enters sleep mode at a step 188 to conserve power.

If the lockout flag was not set at decision step 160, then CPU 16 inspects the "keypad key press timer" at a step 161 to see if the timer (which can be implemented as a counter) has reached a value of zero (0). If the timed counter has expired, then CPU 16 advances the logic flow to a step 182, which flushes (clears) the "key input buffer" and clears the "random access code" in RAM 22 of lock box 5. A step 184 then produces a unique audible sound though buzzer 19, indicating the existence of an error condition. CPU 16 then enters sleep mode at step 188 to conserve power.

If the "key press time counter" of keypad 14 is not zero (0) when inspected at step 161, CPU 16 will test the value of the key that has been pressed on keypad 14; a decision step 162 determines if ENTER key is has been pressed, thereby signaling the end of an input sequence. If the key that was pressed is not the ENTER key, then the logic flow advances to a step 166 in which the value of the key that was presses is stored in RAM 22 in a memory location that acts as an "input buffer." In this manner, multiple key presses are accumulated in the input buffer of RAM 22 to form a string of key presses that can be inspected later by CPU 16 to determine if the string is equivalent to one of a set of known sequences that should initiate predetermined lock box functions. After the key presses are stored, a step 167 is executed by CPU 16 in which the keypad's "key press time counter" is reset. CPU 16 then enters sleep mode at step 188 to conserve power.

If step 162 determined that the ENTER key was pressed, then a decision step 163 is executed in which CPU 16 evaluates whether the "key press input buffer" in RAM 22 is currently empty of non-ENTER key presses. If the buffer is empty, then the logic flow continues to step 167 and resets the "key press time counter," after which the CPU enters sleep mode at step 188.

On the other hand, if decision step 163 determines that key press input buffer is not empty, then CPU 16 performs various comparisons to determine whether the data stored in the key press input buffer matches one of a set of predetermined sequences. These comparisons occur at decision steps 164, 165, 168, and 169. Step 164 determines if the "download access log" sequence was entered; step 165 determines if the "program lock box configuration" sequence was entered; step 168 determines if the "key compartment access code" was entered; and step 169 determines if the "shackle release" sequence was entered.

If no match is found between the input buffer data stored in RAM 22 (at steps 164, 165, 168, or 169), then the logic flow is directed to step 184, in which lock box 5 provides a distinct illumination pattern of LED indicator lamps 19 and produces a unique audible sound though buzzer 19 to indicate that lock box 5 is now locked out from operation for a predetermined period of time. CPU 16 then enters sleep mode at step 188 to conserve power.

On the other hand, if one of the decision steps 164, 165, 168, or 169 finds a match between the input buffer data sequence and one of the known (or predetermined) function sequences, the logic flow of processing by CPU 16 continues to the various lock box operational events, as described below.

Description of Download Access Log:

If the "download access log" key entry sequence has been properly entered at step 164, then a decision step 170 causes CPU 16 to exchange data with secure memory card 3 to perform a "card cryptographic challenge response" authentication essence to determine if a valid AT88SC1608 card has been inserted in the smart card connector 17. An unsuccessful result causes CPU 16 to advance to step 182, and the key input buffer flushed and the "random access code" information in RAM 22 is cleared. Moreover, a unique audible sound though buzzer 19 and a visual error indication is provided under control of step 184. CPU 16 then enters sleep mode at step 188 to conserve power.

On the other hand, a successful result of the challenge response process at decision step 170 results in the logic flow arriving at a decision step 174, in which CPU 16 reads the contents in memory 31 of secure memory card 3 to determine if the "lock box serial identification number" that is stored in EEPROM 23 of lock box 5 is also contained in a predetermined table stored in the memory 31 of secure memory card 3. This predetermined table (not shown in FIG. 5) contains identification information of potential lock boxes under the control of a particular user (i.e., the user who owns the secure memory card 3).

If the result at decision step 174 is YES, then the current receives permission to retrieve the "lock box access log data" from lock box 5. At a step 178, CPU 16 copies the lock box access log data from RAM 22 and EEPROM 23 of lock box 5 to the memory circuit 31 of secure memory card 3. The logic flow then continues to a step 183, in which CPU 16 causes lock box 5 to generate a distinct illumination pattern of LED indicator lamps 19 and to produce a unique audible sound though buzzer 19, thereby indicating a successful operation. A step 185 is then executed in which CPU 16 clears or flushes the "keypad input buffer" and clears the "random access code" from RAM 22. CPU 16 then enters sleep mode at step 188 to conserve power.

On the other hand, if no "lock box serial identification number" match is found at step 174, then the logic flow advances to steps 182 and 184 to flush the keypad input buffer and clear the access code from RAM 22, and to sound buzzer 20 and provide a visual indication, as described above. The sleep mode is also entered thereafter.

Description of Storing the Lock Box Configuration:

If the "program lock box configuration" key entry sequence has been properly entered at step 165, then a decision step 175 causes CPU 16 to check the state of the "new configuration loaded" flag stored in RAM 22, to determine if a new configuration now exists in RAM 22; this new configuration would have previously been transferred from secure memory card 3 to lock box 5 upon insertion of the secure memory card 3 into the smart card connector 17 of lock box 5. If the flag is clear, then the logic flow for CPU 16 advances to steps 182 and 184 to perform functions that have been described above.

However, if the "new configuration loaded" flag is set, then CPU 16 copies the "lock box configuration data" at a step 179 from RAM 22 (of lock box 5) to EEPROM 23 (of lock box 5), and also clears the "new configuration loaded" flag. The logic flow then continues to steps 183 and 185 to perform functions that have been described above.

Description of Activate Key Compartment Release Mechanism:

If the "key compartment access code" has been properly entered at decision step 168, a decision step 172 now causes CPU 16 to compare the "keypad input buffer" data to the "random access code" stored in RAM 22. If no match is found, then the CPU 16 compares the contents of keypad input buffer to the "progressive security codes" stored in RAM 22 at a decision step 176. In an exemplary embodiment of the present invention, the RAM 22 of Lock box 5 contains multiple (e.g., three) "progressive security codes" as follows: the previous progressive security code, the current progressive security code, and the next progressive security code. These three codes provide a code "validation window" to allow for eventual time drift between the access code generation that occurs in lock box 5 and access code generation that occurs at the central clearinghouse computer 60.

If none of the progressive security codes found in RAM 22 match the access code stored in the input buffer at step 176, the logic flow now causes CPU 16 to increment the "access attempt counter" and, at a decision step 186, CPU 16 compares the counter's value to determine if it is less than four (4). If the value of the "access attempt counter" stored in RAM 22 is equal to or greater than four (4), then CPU 16 sets a "lockout mode" flag in RAM 22 at a step 187, and the logic flow is directed to steps 182 and 184 to perform functions described above. The "attempt counter" is used to prevent a trial and error approach by a person who is attempting to guess the lock box's access code.

However, if a match occurs in step 176, then the logic flow for CPU 16 advances to a step 171 in which the "serial identification number" information of secure memory card 3 is now stored in the "access log" memory location of RAM 22 in lock box 5. The logic flow then advances to a step 181 and performs a function described below.

If an access code match is obtained in step 172, the logic flow for CPU 16 proceeds to a decision step 177 in which CPU 16 determines whether or not a low battery condition exists. If the battery condition is low, then at a step 180 CPU 16 sets a "low battery reported" flag in the RAM 22 of lock box 5. The logic flow then proceeds to step 171, and the serial ID number information of secure memory card 3 is stored in the access log memory location of RAM 22. The logic flow then advances to a step 181 and performs a function described immediately below.

At step 181, CPU 16 activates the lock drive circuit 25 and thereby causes the lock box's key compartment 10 to assume its unlocked condition. CPU 16 then causes buzzer 19 to emit a unique sound at step 183, thereby indicating to the user the unlocked state of the key compartment. The user can then open the key compartment and access the contents thereof (usually a house key). Another function performed at step 181 causes CPU 16 to wait for a predetermined period of time (e.g., three minutes) and then activate the lock drive circuit 25 in a manner to cause the key compartment mechanism to return to its locked state. In an exemplary embodiment of the present invention, the lock mechanism is designed such that a return to the locked state with the key compartment still in the open state will not cause a malfunction. Instead, engagement of the key compartment occurs when the lock mechanism is locked and the user closes the key compartment. A more complete description of the mechanical properties of lock box 5 is found below. At the completion of the lock mechanism cycle, step 185 is executed in which CPU 16 clears or flushes the "keypad input buffer" and clears the "random access code" from RAM 22. CPU 16 then enters sleep mode at step 188 to conserve power.

An alternative methodology that can be used with the above lock box procedure, is to encrypt the access code information, and change the numeric value of the access code from one method step to the next. On FIG. 12, some of the flow chart steps could perform an additional function (i.e., change the numeric value) each time the access code is inspected; for example, steps 168, 172, 176, etc. all deal with the access code. Using an encryption routine for these steps, the access code value could be altered at each of these steps in a known pattern. Therefore, the next step would be looking for a different numeric value, but would be programmed to determine exactly what that new, different numeric value should be. This alternative approach could be used to increase the security level of the access code validation for the entire system.

Description of Activation of Shackle Release Mechanism:

If the "shackle release" key entry sequence has been properly entered at step 169, then a decision step 173 causes CPU 16 to activate the shackle drive circuit 24 which causes the shackle 6 of lock box 5 to assume its unlocked state. The logic flow then causes CPU 16 to activate buzzer 19 to emit a unique sound at step 183, thereby indicating the unlocked state of the shackle. The user can then remove the lock box 5 from the fixed object (such as a doorknob).

Another function of step 173 causes CPU 16 to wait for a predetermined period of time (e.g., three minutes) and then activate the shackle drive circuit 25 in a manner to cause the shackle mechanism to return to its locked state. In an exemplary embodiment of the present invention, the shackle mechanism is designed such that a return to the locked state with the shackle still in the open condition does not cause a malfunction. Instead, engagement of the shackle occurs when the shackle mechanism condition is locked and the user closes the shackle. A more complete description of the mechanical properties of lock box 5 is found below. At the completion of the shackle mechanism cycle, step 185 is executed in which CPU 16 clears or flushes the "keypad input buffer" and clears the "random access code" from RAM 22. CPU 16 then enters sleep mode at step 188 to conserve power.

Description of Storing Lock Box Configuration Data to the Secure Memory Card:

In the present invention, the programming of lock access configuration data is accomplished through computer 4 (see FIG. 1) and clearinghouse computer 60 (see FIG. 7). These computer systems communicate over the Internet, using Internet connections 69 and 91 (see FIG. 9) and exchange data regarding the lock box system. The lock box configuration process begins with the user inserting their secure memory card 3 into either the portable computer device 1 that has been connected via cradle 8 and cable 7, or alternatively by inserting secure memory card 3 into the PC "smart card" reader 2 (see FIG. 1). Either method will achieve the same results since both devices function as smart card readers when connected to computer 4. This concept is reflected on FIG. 9, in which the "smart card reader" 93 represents either the cradle 8 or the card reader 2 of FIG. 1.

Software residing on computer 4 will detect the card insertion into the cradle 8 or smart card reader 2 (i.e., the reader 93 of FIG. 9), and cause software to begin executing on computer 4. The user is prompted for his or her personal identification number (PIN). The PIN function largely ensures that the person accessing the secure memory card is indeed the owner of the card. Software on computer 4 exchanges data with clearinghouse computer 70 regarding the serial identification number of secure memory card 3 via the Internet connections 69 and 91. Clearinghouse computer 60 provides appropriate data that is dependent upon the status retrieved from clearinghouse computer database 62 (e.g., the user must be "current" to receive valid access codes). If the user is still in good standing, then the ultimate end result of this process is that secure memory card 3 will contain the data record shown in FIG. 14. A description of these data element is as follows:

(1) Lock box number: the lock box unique serial identification number.

(2) By appointment only PIN: a special four-digit access code suffix that must be given by the listing agent to access the key.

(3) Access time table: forty-two (42) bytes of data representing every day of the week and every half hour of the day. Each day has six (6) bytes or forty-eight (48) bits of data, one bit for each half hour period. A Logic 1-bit in a position indicates access is allowed while a Logic O-bit indicates no access is allowed. This access time coding allows multiple periods during a given day to be allowed or disallowed.

(4) Showing instructions: a short text reminder of any specific showing instructions for the home.

(5) Agent Name: the name of the listing agent.

(6) Agent Phone: the contact number for the listing agent.

(7) Hash code: a hash of the card data using a secret seed to ensure data integrity Secure memory card 3 is inserted into the smart card connector 17 of lock box 5, and the lock box's CPU 16 authenticates the secure memory card 3 through a cryptographic challenge response. FIG. 10, discussed above, provides a flow chart of the processing steps performed by CPU 16 when a card is inserted in connector 17. Once a data exchange between lock box 5 and secure memory card 3 has been completed, piezo buzzer 19 emits a unique audible signal indicating completion of the data exchange.

As discussed above, the lock box 5 stored configuration information in its EEPROM memory 23 merely for future delivery to portable computer device 1 during the "showing phase" of lock access, for processing on the portable computer device.

Description of Accessing the Key Compartment Access Mode 1:

A flow chart on FIG. 13 describes some of the important logical operations of the portable computer device 1 as it interacts with a lock box 5. At a step 230, the secure memory card (or "smart card") 3 is inserted (or "coupled") by the user into the smart card connector 17 of lock box 5. When the secure memory card 3 is fully inserted, the card insert switch integrated into the connector closes and causes the CPU 16 to wake and execute the Lock Box Smart Card Insertion Wakeup sequence described above. After the wakeup sequence, the secure memory card 3 is ready to be inserted into the portable computer device 1 smart card connector 46.

A decision step 231 performs a cryptographic challenge response with the secure memory card 3. If the challenge response fails, at a step 232 a message is shown on LCD display 42 of the portable computer 1 indicating a "bad card" at a step 243, and the challenge response procedure ends. The challenge response ensures that only secure memory cards issued by a specific card issuer are capable of being used with the lock box 5.

On the other hand, if the challenge is successful at step 231, CPU 48 reads its internal clock calendar at a step 232 and compares the expiration date on secure memory card 3 with the value retrieved. If the expiration date has been reached, a decision step 233 determines if the "next renewal code empty" flag is set. If the answer is YES, then a "Card Expired" message is shown on display 42; if the answer is NO, then a "Renew! Call 800-XXX-XXXX" message is shown on display 42 at a step 234, followed by a "SN ######## CODE?" message at a step 235. This expiration feature ensures that access codes will not be revealed by portable computer device 1 after a predetermined amount of time has passed, thus making deactivated (or lost) secure memory cards useless after a predetermined amount of time.

Figure 15:
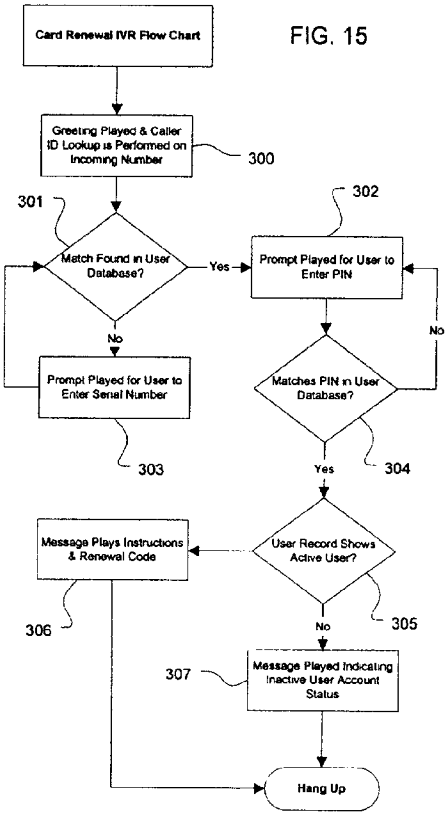
FIG. 15 is a flow chart showing some of the important logical operations performed by the IVR system in the present invention.

If a renewal code is required by the portable computer, then the user must enter that code to further proceed with the operation of the portable computer 1 at this point in the logic. This occurs as the logic flow approaches a decision step 238; the CPU 48 will wait at step 238 for the user to enter a renewal code on keypad 43. Further processing steps involving the renewal code are discussed below, in reference to both FIG. 13 and FIG. 15.

If the secure memory card 3 has not expired, the logic flow proceeds from decision step 232 to a decision step 236 in which CPU 48 determines if a fresh set of lock box configuration information has been stored to the card since the last access attempt made by the user. If the lock box configuration data is not new (or fresh), an "Insert Card in Lockbox" message is shown on display 48 at a step 237 and processing stops for now at portable computer 1.

If new (or fresh) lock box configuration data exists at step 236, then at a decision step 242 CPU 48 compares the lock box region code with the list of region codes for the user (i.e., where the user is authorized to operate) stored in the memory 31 of secure memory card 3. If the user is not authorized to access the lock box based on its region designation, a "Not Authorized for This Region" message is shown on display 42 at a step 256, and processing stops at portable computer 1. The regionalization function allows conditional access to lock boxes according to a geographic distribution. Thus a user cannot obtain access to a lock box unless they have been authorized to do so for a given region.

If the region in the lock box configuration matches one of the regions in the memory 31 of secure memory card 3, the logic flow proceeds to a step 248 where the user PIN is requested by a message "Enter Your PIN" on display 42. The entered PIN value is compared by CPU 48 at a decision step 254 to the PIN previously stored in memory 31 of secure memory card 3. If the PIN is invalid, the PIN request is repeated in which a decision step 246 first determines if a predetermined limit of attempts (such as three) is reached, and if not a "Re-enter PIN" message is shown of display 42 at a step 245.

However, if the attempt limit is reached at step 246, then a "Bad PIN, Sorry" message is shown on display 42 at a step 247 to indicate PIN failure to the user. If that occurs, the CPU 48 checks at a decision step 250 to see if a predetermined number (e.g., three) of consecutive PIN attempt cycles has occurred. If the limit is reached at step 250, then CPU 48 sets the expiration data of secure memory card 3 to "today" at a step 252, and clears the renewal code at a step 253. This prevents a systematic attack on the use PIN. The secure memory card can then only be renewed at a computer 4 loaded with appropriate software. The processing at portable computer 1 then stops for now.

Description of Time of Day Access Control:

If the user enters a valid PIN at decision step 254, then the current time of day is compared with the "access time table" stored in the lock box configuration data at a decision step 249. In an exemplary embodiment of the present invention, time of day and day of week data is encoded such that multiple times and days can be individually allowed or denied within a precision of 30 minute intervals (or time windows) for each day of the week. For example, a user could make a designation for a particular home in which access may be denied on every Friday between 2:00 P.M. and 4:00 P.M., or on every Monday between 8:00 A.M. and 8:30 A.M.

If CPU 48 determines the current time does not fall within one of the allowed access times (at step 249), the a "Next Time MM/DD HH:MM" message is displayed at a step 255 on the display 42, which indicates when the next available showing time will occur for this particular lock box 5. In addition, a "Call Agent (phone number) #######" message is displayed at a step 257 along with the agent's name at a step 258, which provides to the user the agent's contact information to call for a possible showing by appointment.

An "Enter Appointment Code" message is then displayed at a step 269 on display 42, and CPU 48 waits for input of a "showing by appointment" code by the user on keypad 43 of the portable computer 1. The entered appointment code is compared by CPU 48 at a decision step 270 to the contents of memory 31 of secure memory card 3. If the comparison at step 240 is successful, the logic flow proceeds to a decision step 271, which is described below. Alternatively, if the comparison at step 270 fails, then a decision step 267 determines if the number of "appointment code" attempts has reached a predetermined limit (such as three). If this limit has not been reached, the user can re-enter the appointment code at step 270 after a "Re-enter Code" message is displayed at a step 266. On the other hand, if this limit has been reached, then a "Bad Appointment Code, Sorry" message is shown on display 42 at a decision step 268, and processing stops at the portable computer 1.

Description of Low Battery Reporting:

At step 249, if the time of access is an allowed access time, then the logic flow is directed to a decision step 259 in which CPU 48 determines if the low battery flag is set in secure memory card 3. If the answer is YES (i.e., the battery voltage has fallen below a predetermined threshold), then a "Call 800-XXX-XXXX" message is displayed by the display 42 at a step 260 to indicate the existence of a low battery condition of the electrical circuit in the lock box 5. The user must then call the telephone number indicated on display 42, and is connected to IVR system 65. The IVR system is discussed in a flow chart below, in connection with FIG. 16.

A step 261 displays a message, "Lockbox ########," so the user can inform the IVR system 65 as to which lock box 5 in the system 9 has the low battery condition. After this occurs, an "Enter System Code" message is displayed on display 42 at a step 262, and the user must enter a number (at a step 264) that he or she receives from the computer 66—the central clearinghouse computer 60—over the telephone during the interaction with the IVR system 65 (see FIG. 16).

Note that it is typical for many users to be unconcerned with the battery status of another user's lock box, provided the user presently at the lock box is still able to access the key compartment. Also, a visual indicator on the lock box would ultimately be ignored. The method described above forces the user into reporting the low battery condition to the central clearinghouse computer 60, otherwise the access code will not be disclosed to the user at the lock box, thereby preventing lock access.

Figure 16:
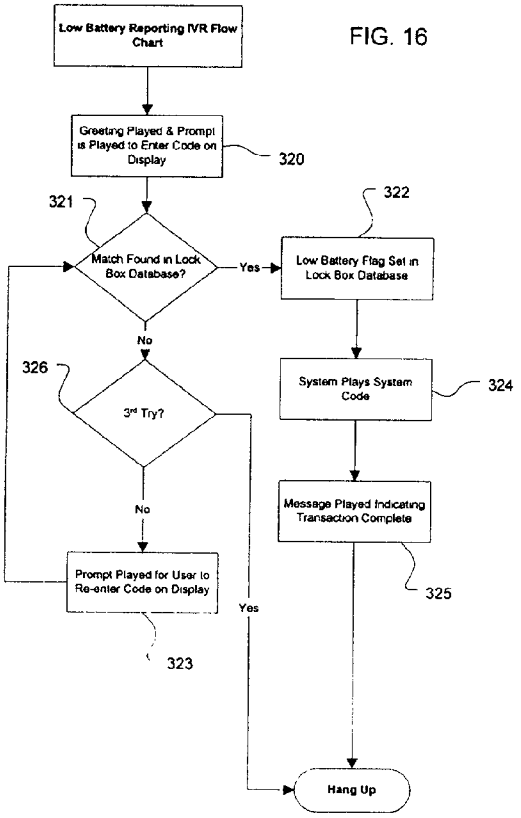
FIG. 16 is a flow chart showing further of the important logical operations performed by the IVR system in the present invention.

When the IVR system 65 answers the call offered over telephone line 68, through the telephone line interface 67, it plays a series of voice prompts. Referring now to FIG. 16, a step 320 plays voice prompts asking the user to enter the lock box serial identification number printed or displayed on the lock box 5. A decision step 321 attempts to match the entered lock box serial identification number with information stored into the database 62 of the clearinghouse computer system 60. If a match is not found, then a step 323 prompts the user to re-enter the lock box serial identification number. The re-enter prompt is replayed a limited number of times, as determined at a decision step 326, and if no match is ever found during this interaction session, the IVR system 65 will hang up.

On the other hand, if a serial identification number match with a lock box record in database 62 is found in step 321, then the IVR system 65 updates database 62 by setting the low battery flag in this particular lock box record at a step 322. The IVR system 65 now generates a "system release code" at a step 324, and plays appropriate voice instructions and the system release code to the user at a step 325. After that occurs, the IVR system 65 will hangs up.

After the IVR system 65 discloses the "system release code" to the user at the other end of the telephone line, the user keys this code into keypad 43 of the lock box 5, and CPU 48 validates the code at a decision step 264 (see FIG. 13). If the system release code was entered incorrectly, a limited number of attempts are allowed by a decision step 265. If the attempt limit has been reached at step 265, a "Bad System Code" message is displayed on display 42 at a step 274, and processing stops at portable computer 1. If the attempt limit has not been reached at step 265, the "Enter System Code" message is re-displayed at step 262. If the correct system release code is entered at step 264, then the logic flow is directed to a decision step 263, described immediately below.

Description of "Showing by Appointment Only:"

If the answer was NO at decision step 259 (i.e., the battery voltage is normal), then the logic flow is directed to a decision step 263 which determines if the "showing by appointment" flag is set. Furthermore, this step 263 is also reached from step 264 after a "system release code" is correctly entered after a Low Battery indication has occurred. If this flag not set, then the logic flow continues to decision step 271 to determine whether or not there are any "showing instructions," which is a function described below. On the other hand, if the "showing by appointment" flag is set, then the logic flow is directed to step 257 which informs the user to call the listing agent, as described above.

The "showing by appointment" function forces the user at the lock to contact the homeowner's representative (i.e., the "listing agent" in most realtors' terminology) prior to accessing the lock box key compartment 10. The homeowner's representative conditionally discloses a special showing by appointment PIN that was preloaded into the EEPROM memory 32 of lock box 5, and which subsequently has been copied to the memory 31 of secure memory card 3, and is read by portable computer device 1.

If CPU 48 finds a showing by appointment (SBA) flag is set in the contents of memory 31 of the secure memory card 3 at step 263, then steps 257 and 258 displays the agent's contact information to call for a possible showing by appointment. Step 269 then shows an "Enter Appointment Code" message on display 42, and CPU 48 waits at step 270 for the user to enter the correct "showing by appointment code" on keypad 43. At decision step 270, the appointment code is compared by CPU 48 to the contents of memory 31 of secure memory card 3. If the comparison succeeds, the logic flow is directed to decision step 271 to inquire about any special showing instructions. If the comparison fails, the logic flow is directed to step 267 to determine if the number of appointment code attempts has reached a predetermined limit. If the limit has not been reached, the user can re-enter the appointment code through step 266. If the limit has been reached message, then the "Bad Appointment Code, Sorry" message is displayed at step 268, and processing stops at portable computer 1.

Description of Showing Instructions Feature:

Upon reaching decision step 271, the CPU 48 determines whether any showing instruction text is stored in the memory 31 of secure memory card 3. If so, a message is displayed at a step 273, and the user may scroll through the text if the message consists of multiple lines that cannot all be displayed at one time on the LCD display 42. Showing instructions are important to the user's access of the dwelling, as there may be important information such as alarm codes, pet warnings, or other critical information to convey prior to entry of the home.

After all instructions are viewed on display 42, the logic flow is directed to a step 272, as described immediately below.

Description of Access Code Disclosure (Accessing the Key Compartment, Mode 1):

At step 272, the activities on the portable computer 1 are completed by displaying the "random access code" for this particular lock box 5, which was generated in step 142 (see FIG. 10). The access code is displayed by CPU 48 on display 42, which is the only way the user can finally obtain access to the key compartment of the lock box when using the portable computer 1 in a first exemplary embodiment of the present invention. The user then enters the access code on keypad 14 of lock box 5 to gain access to the lock box's key compartment and retrieve the contents of the lock box, as described above in reference to FIG. 12 (at step 181). After step 272 is executed, the processing stops for portable computer 1; the CPU can "time out" after first displaying the message at step 272, or the user can press a "stop" or "off" button if one is provided on the portable computer 1. Not every "smart card" computer will necessarily have an "off" button.

Description of Cell Phone Access (Accessing the Key Compartment, Mode 2):

An alternative methodology for accessing lock boxes used in real estate sales is to use a cell phone for obtaining access codes, rather than use of a smart card and a portable computer, as discussed above in detail. When using cell phone access, the smart card (i.e., a secure memory card 3) is used only with the computer resident in the lock box 5. In other words, there is no portable computer 1 required in this "mode 2" alternative methodology.

Figure 17:
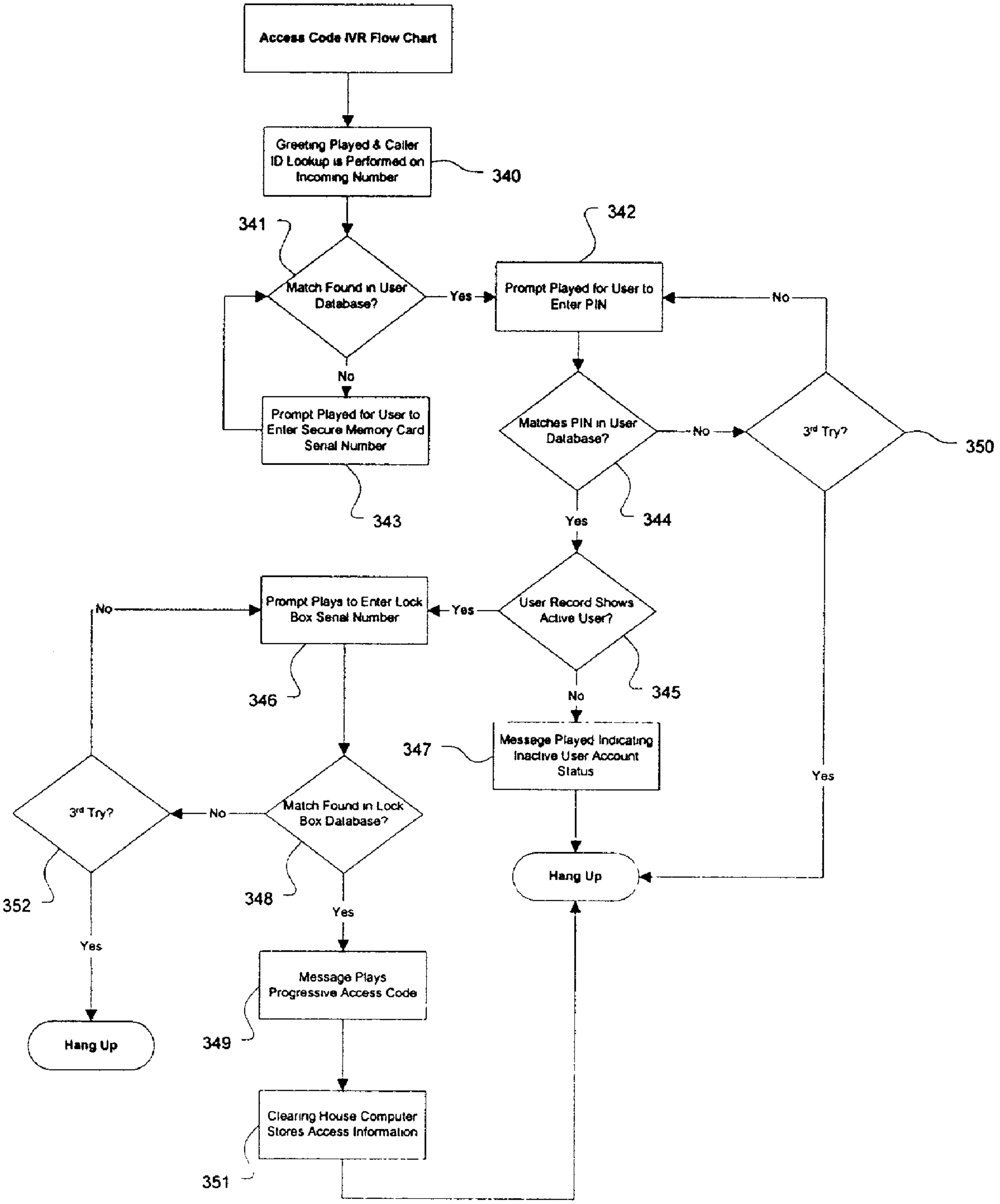
FIG. 17 is a flow chart showing yet further of the important logical operations performed by the IVR system in the present invention.

Referring now to FIG. 17, a flow chart is depicted for an alternate method of lock box access that does not involve a secure memory card 3 or a portable computer 34. This method is useful when it is inconvenient to carry both devices, or in the situation where a low/dead battery on portable computer 34 makes it impossible to use the access method described above. To begin this process, a user calls into the IVR system 65 over a telephone line or a mobile or cell phone. At a step 340, IVR system 65 answers the incoming call over telephone circuit 68 via telephone interface 67 (see FIG. 7). IVR system 65 performs a lookup of the users' phone number in the clearinghouse computer database 62. A decision step 341 determines whether or not the calling telephone number matches a record in database 62. If so, the logic flow proceeds to a step 342. If not, voice prompts are played at a step 343 requesting the user to enter his or her secure memory card serial number (which can be printed or embossed on the card itself).

In step 342, the IVR system 65 plays an audible prompt requesting the user to enter his or her personal identification number (PIN). A decision step 344 determines whether the entered PIN matches the PIN stored in database 62. If the PIN is incorrect (i.e., no match is found), the number of incorrect PIN entries (i.e., the number of attempted entries) is checked at a decision step 350, and if number exceeds a preset value (e.g., three), the IVR system 65 hangs up on the caller. Otherwise the user is prompted again for his or her PIN at step 342.

Upon entering a correct PIN, a decision step 345 checks to see if the user's status is "active." If not, an audible message is played by IVR system 65 indicating the "inactive" status at a step 347 and the IVR system hangs up on the caller. However, if the user record in database 62 indicates an active user, then the logic flow proceeds to a step 346 at which the IVR system 65 plays a prompt requesting the user to enter the lock box serial number.

In a decision step 348, it is determined whether or not the entered serial number exists in database 62. If the lock box serial number is not found in database 62, the user is prompted again in step 346 to enter the lock box serial number. However, the number of attempts made to enter the lock box serial number is first determined at a decision step 352, and if the number exceeds a preset value (e.g., three), the IVR system 65 hangs up on the caller.

If at decision step 348 a matching lock box serial number is found in database 62, then IVR system 65 plays (audibly) the current progressive access code for the requested lock box at a step 349. Next, the access log stored in database 62 is amended with the user ID, lock box serial number, and access time information at a step 351. The user may then enter the access code played by IVR system 65 on keypad 14 of the lock box 5.

Figure 8:
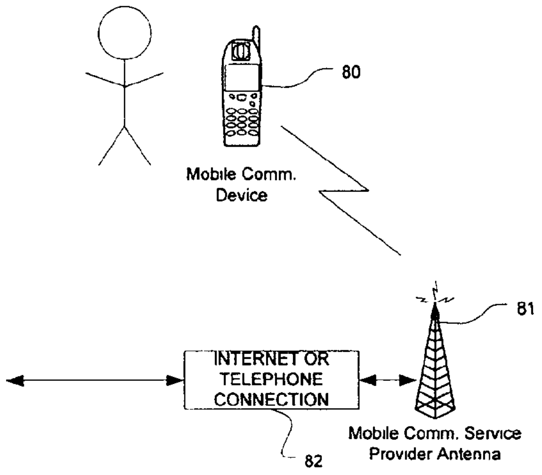
FIG. 8 is a schematic block diagram of a mobile communications system used in another aspect of the present invention.

In an alternative methodology of the phone access mode, a voice telephone call may be replaced by a wireless data call, as shown in FIG. 8. In this scenario, the user communicates with clearinghouse computer 60 over Internet connections 69 and 82. The mobile communications service provided relays data from a wireless mobile communications device 80 through a radio tower 81 to Internet connection 82. IVR voice prompts are replaced with prompts that are displayed (or they could be audible responses) on the wireless data device 80, thereby accessing software residing on clearinghouse computer 60. The user is prompted for data and enters data, by use of a logic pattern similar to that depicted in FIG. 17, into the wireless mobile communications device 80. Access code information is delivered to the mobile communications device 80, and the user may enter the access code on keypad 14 of the lock box 5.

Description of Secure Memory Card Renewal:

In some situations, the user will need to "renew" his or her secure memory card 3. One way to do this is over the telephone line; the user dials a telephone number of the IVR system 65 displayed by CPU 48 on the LCD display 42. IVR system 65 answers the incoming call over telephone line 68 (see FIG. 7) via telephone line interface 67, and plays a series of voice prompts as described in a flow chart depicted in FIG. 15. At a step 300, the IVR system 65 plays a greeting message and the caller identification (ID) information is inspected by CPU 66 of the IVR system 65.

A decision step 301 attempts to match the caller ID information in the user database 62 at the clearinghouse computer system 60. If no match can be found between the incoming caller ID information with the user record in database 62, the user is prompted at a step 303 to enter his or her secure memory card 3 serial identification number that was displayed on LCD display 42 in step 235. (See FIG. 13.) The number of attempts allowed the user at step 301 is preferably limited to a predetermined maximum number (such as three or four).

Once a user record from database 62 is matched with the user's serial identification number, IVR system 65 next prompts the user for his or her PIN at a step 302. The user enters the PIN using the telephone keypad (see 80 on FIG. 8), and IVR computer 66 verifies the PIN in a decision step 304. The number of attempts allowed the user at step 304 is preferably limited to a predetermined maximum number (such as three or four).

If the PIN entered by the user is valid, computer 66 next inspects the user database 62 to determine if the user account is "active" at a decision step 305. If the account is currently inactive, IVR system 65 plays a message to that effect at a step 307 and then hangs up. However, if the account is active, IVR system 65 reads the "renewal code data" from database 62 and plays appropriate instructions and the renewal code to the user at a step 306. After passing the necessary information to the user at step 306, the IVR system 65 hangs up.

The user can enter the "renewal code" on keypad 43 at step 235 on FIG. 13, as described above. Once entered, the renewal code is compared by CPU 48 to data read from the secure memory card 3 at decision step 238. If no match is found, the logic flow is directed to a decision step 239 which determines if the maximum allowable number of attempts (e.g., three) have been made. If this maximum limit has not been reached, the logic flow returns to step 235 which displays a message on the LCD display 42. On the other hand, if the limit has been reached, CPU 48 shows a "Renewal Failed" message on display 42 at a step 241, and subsequently clears the renewal code memory location in memory 44 at a step 251, thus rendering the secure memory card 3 un-renewable for now. In this condition, the secure memory card 3 must be taken to computer 4 and inserted into the smart card reader 2 for further programming with new information. This methodology will prevent a systematic attack on the card renewal function.

If a match was found at decision step 238 (i.e., a good renewal code was entered by the user at step 235), then CPU 48 clears the next renewal code on secure memory card 3, updates the expiration date on secure memory card 3 using the data contained in the renewal period value, and displays a "Success" message on display 42 at a step 240. After that has occurred, the logic flow is directed to a decision step 244 in which CPU 48 determines if a fresh set of lock box configuration information has been stored to the secure memory card 3 since the last access attempt was made by the same user. If the lock box configuration data is not new (or fresh), then processing stops at portable computer 1. However, if new lock box configuration data exists, then the logic flow continues to step 242 to determine a "region match," as described above.

It will be understood that the logical operations described in relation to the flow charts of FIGS. 10–13 and 15–17 can be implemented using sequential logic, such as by using microprocessor technology, or using a logic state machine, or perhaps by discrete logic; it even could be implemented using parallel processors. The exemplary embodiment described above uses a microprocessor or microcomputer in the lock box 5 and in the portable computer 1 to execute software instructions that are stored in memory cells within the respective memory circuits for the lock box and for the portable computer. In fact, the CPU 16 of the lock box 5 contains not only the microprocessor circuit, but also some on-board memory elements, including RAM, EEPROM, and FLASH memory cells in an exemplary mode of the present invention. Of course, other circuitry could be used to implement these logical operations depicted in FIGS. 10–13 and 15–17 without departing from the principles of the present invention.

It will be further understood that the precise logical operations depicted in the flow charts of FIGS. 10–13 and 15–17, and discussed hereinabove, could be somewhat modified to perform similar, although not exact, functions without departing from the principles of the present invention. The exact nature of some of the decision steps and other commands in these flow charts are directed toward a specific hardware implementation that was described above, and certainly similar, but somewhat different, steps would be taken for use with other types of hardware systems in many instances, with the overall inventive results being the same.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for operating an electronic lock box system, said method comprising:

(a) providing an electronic lock box having a compartment with a controlled access member, a first memory circuit for storage of data, a first keypad, a first communications port, and a first processing circuit;

(b) providing a portable computer having a second memory circuit for storage of data, a second keypad, a display, a second communications port, and a second processing circuit;

(c) providing a portable memory device containing a non-volatile third memory circuit;

(d) coupling said portable memory device to said first communications port of the electronic lock box so as to permit communications therebetween, and loading access code information from said first memory circuit to said third memory circuit;

(e) uncoupling said portable memory device from said first communications port of the electronic lock box;

(f) coupling said portable memory device to said second communications port of the portable computer so as to permit communications therebetween, and reading said access code information from said third memory circuit to said second memory circuit;

(g) entering identification information using said second keypad, and if the identification information is correct as determined by said portable computer, displaying said access code information on said display to a human user; and (h) entering said access code information using said first keypad, and if the access code information is correct as determined by said first processing circuit, releasing said controlled access member of the compartment.

2. The method as recited in claim 1, wherein said access code information comprises a random number generated by said electronic lock box.

3. The method as recited in claim 1, wherein said access code information is encrypted and changes value from one method step to the next.

4. The method as recited in claim 1, wherein said access code information can be used only a single time and within a predetermined time window, after which the access code information automatically expires on said electronic lock box.

5. The method as recited in claim 1, wherein said access code information is displayed along with showing instructions.

6. The method as recited in claim 1, wherein said access code information is displayed only upon at least one oft-be following conditions being correct: (a) time of day; (b) day ofweek; (e) association membership; (d) use's personal identification number; (e) use's status being active; and (I) showing by appointment only.

7. The method as recited in claim 1, wherein successful accesses to said electronic lock box are stored in said first memory circuit as an access log, which may be downloaded onto said third memory circuit using a predetermined command entered at said first keypad.

8. The method as recited in claim 1, wherein said first processing circuit of the electronic lock box frequently enters a sleep state, and is awakened by one of the following events: (a) coupling of said portable memory device to said first communications port; (b) a key press of said first keypad; and (c) expiration of a time interval of a periodic timer circuit.

9. The method as recited in claim 1, wherein said controlled access member is actuated by a rotating motor drive when said motor drive rotates in a first direction; and when said motor drive rotates in a second, opposite direction upon the occurrence of an appropriate command, a shackle release occurs.

10. A method for operating an electronic lock box system, said method comprising:

providing an electronic lock box having a first computer;

providing a portable computer having a display;

generating, at said first computer, a random number;

determining, at said portable computer, whether a user has proper clearance to allow access to said electronic lock box, and if so displaying an appropriate access code on said display, said appropriate access code being based upon said random number; and entering said appropriate access code on a keypad of said electronic lock box, and thereafter releasing a controlled access member to obtain entry to a compartment of said electronic lock box.

11. The method as recited in claim 10, further comprising the steps of:

coupling a portable memory card to said first computer and transferring said random number from said first computer to said portable memory card;

disengaging said portable memory card from said first computer, and thereafter, coupling said portable memory card to said portable computer and transferring said random number from said portable memory card to said portable computer.

12. The method as recited in claim 10, wherein said appropriate access code has the same numeric value as said random number.

13. The method as recited in claim 10, wherein said appropriate access code is encrypted and does not have the same value as said random number, and said first computer executes a computer program that generates a numeric value that corresponds to said encrypted access code, thereby allowing entry to said compartment.

14. The method as recited in claim 10, wherein said appropriate access code can be used only a single time and within a predetermined time window, alter which said appropriate access code automatically expires on said first computer.

15. The method as recited in claim 10, wherein said appropriate access code is displayed only upon at least one of the following conditions being correct: (a) time of day; (b) day ofweek; (c) association membership; (d) user's personal identification number; (e) user's status being active; and (f) showing by appointment only.

16. The method as recited in claim 10, wherein successful accesses to said electronic lock box are stored in a memory circuit of said first computer as an access log, which may be downloaded onto said portable memory card using a predetermined command.

17. The method as recited in claim 10, wherein said controlled access member is actuated by a rotating motor drive when said motor drive rotates in a first direction; and when said motor drive rotates in a second, opposite direction upon the occurrence of an appropriate command, a shackle release occurs.

18. A method for operating an electronic lock box system, said method comprising:

providing an electronic lock box having a first computer;

providing a second computer at a remote location from said first computer;

providing a portable communications device used by a human user;

providing a communication link between said second computer and said portable communications device;

generating, at said first computer, a first plurality of pseudo random numbers that change at predetermined time intervals using a predetermined algorithm in conjunction with first predetermined seed data;

generating, at said second computer, a second plurality of pseudo random numbers that change at predetermined time intervals using a predetermined algorithm in conjunction with second predetermined seed data, in which said first and second predetermined seed data are the same for said electronic lock box;

accessing, using said portable communications device, said second plurality of pseudo random numbers over said communications link and thereby obtaining an access code; and entering said access code on a keypad at said first computer, and thereafter releasing a controlled access member to obtain entry to a compartment of said electronic lock box.

19. The method as recited in claim 18, wherein said access code has the same numeric value as said one of said first plurality of pseudo random numbers at a particular moment in time, and wherein access code has the same numeric value as said one of said second plurality of pseudo random numbers at the same said particular moment in time.

20. The method as recited in claim 18, wherein said first plurality of pseudo random numbers and said second plurality of pseudo random numbers are both generated using a linear congruential random number generator that executes at both said first computer and at said second computer.

21. The method as recited in claim 18, wherein, using said portable communications device, the step of accessing said second plurality of pseudo random numbers over said communications link involves a mobile telephone, and the human user listens to computer-generated voice data transmitted by said second computer, which comprises a central clearinghouse computer.

22. The method as recited in claim 18, wherein, using said portable communications device, the step of accessing said second plurality of pseudo random numbers over said communications link involves a computer network connection, and the human user views data on a computer display associated with said portable communications device, in which said data is transmitted by said second computer, which comprises a central clearinghouse computer.

23. The method as recited in claim 18, wherein a clock circuit associated with said first computer is temperature compensated so as to produce said predetermined time intervals which are substantially in close synchronization with said predetermined time intervals produced at said second computer.

24. A method of operating an electronic lock box system, said method comprising:

providing a lock box with a secure compartment therein and a shackle for attachment to a fixed object;

providing a secure memory device;

providing a communications link used for exchanging data between said secure memory device and said lock box;

providing a portable computer that is capable of reading said secure memory device, said portable computer having a visual display device;

coupling said secure memory device and said lock box in such a way so as to permit communication between the secure memory device and the lock box through the communications link;

storing lock box configuration data and storing secure compartment access code data in said secure memory device through the communications link;

de-coupling said secure memory device from said lock box; and coupling said secure memory device to said portable computer, reading said secure compartment access code data, and, by use of said visual display device of the portable computer, conditionally revealing said secure compartment access code data to a human user.

25. A method of operating an electronic lock box system, said method comprising:

providing an electronic lock box with a secure compartment therein and a shackle for attachment to a fixed object;

providing a mobile communications device, said mobile communications device having a visual display device;

providing a central clearinghouse computer at a remote location from said electronic lock box;

establishing a communication link between said mobile communications device and said central clearinghouse computer;

thereafter, transmitting to said central clearinghouse computer unique identification information about said electronic lock box and unique identification information about a user requesting access to said electronic lock box;

thereafter, conditionally transmitting from said central clearinghouse computer a secure compartment access code data to said mobile communications device, and, by use of said visual display device of the mobile communications device, revealing said secure compartment access code data to a human user; and thereafter, manually entering said secure compartment access code data on a keypad at said electronic lock box, and thereafter releasing a controlled access member to obtain entry to said secure compartment.

26. The method as recited in claim 25, wherein said secure compartment access code data is in the form of digital data that can be displayed on the visual display device of said mobile communications device.

27. A method of maintaining an electronic lock system's synchronization of time-refreshed progressive security access codes, said method comprising:

providing a central clearinghouse computer at a remote location, a first computer at an electronic lock, an ambient temperature sensor at said electronic lock, and a clock oscillator circuit having a known temperature drift coefficient at said electronic lock;

reading an ambient temperature at predetermined regular intervals using said ambient temperature sensor;

accumulating clock oscillator dine drift, based on a plurality of electronic lock ambient temperature values taken at predetermined time intervals;

generating a first plurality of time-refreshed progressive security access codes at said first computer;

generating a second plurality of time-refreshed progressive security access codes at said central clearinghouse computer; and adjusting a rate of new access code computation at said first computer using said accumulated clock oscillator time drift, to maintain synchronization between said first plurality of time-refreshed progressive security access codes and second plurality of time-refreshed progressive security access codes.

28. An electronic lock box system, comprising:

an electronic lock box attached to a fixed object, said lock box comprising: a first electrical power source, a first processing circuit, a first memory circuit, a first communications port, an ambient temperature sensor, and a secure key compartment;

a portable computer comprising: a second electrical power source, a second processing circuit, a second memory circuit, and a second communications port;

said first processing circuit, first memory circuit, and first communications port are configured to exchange data wit a secure memory device; and said second processing circuit, second memory circuit, and second communications port are configured to exchange data with said secure memory device, and are further configured to restrict access to said key compartment by conditionally revealing a lock box access code.

29. The electronic lock box system as recited in claim 28, wherein a computer program stored in said first memory circuit may be updated when a predetermined data sequence is received at said first communications port from data stored on a portable memory device which indicates that following read data should be stored, and wherein new read data is then uploaded from said portable memory device and stored in said first memory circuit.

30. The electronic lock box system as recited in claim 28, wherein said predetermined data sequence contains a cryptographic check value tat allows said first processing circuit to verify that the following read data was not fabricated by an unauthorized source.

31. The method as recited in claim 24, further comprising the step of: entering said secure compartment access code data on a keypad at said lock box, and thereafter releasing a controlled access member to obtain entry to said secure compartment of the lock box.

32. A method of operating an electronic lock box system, said method comprising:

providing a lock box with a secure compartment therein and a shackle for attachment to a fixed object;

providing a secure memory device;

providing a communications link used for exchanging data between said secure memory device and said lock box;

providing a portable computer that is capable of reading said secure memory device, said portable computer having a visual display device;

coupling said secure memory device and said lock box in such a way so as to permit communication between the secure memory device and the lock box through the communications link;

storing secure compartment access code data in said secure memory device through the communications link;

de-coupling said secure memory device from said lack box; and coupling said secure memory device to said portable computer, reading said secure compartment access code data, and, by use of said visual display device of the portable computer, conditionally revealing said secure compartment access code data to a human user.

* * * * *

UNITED STATES PATENT AND TRADEMARK OFFICE

CERTIFICATE OF CORRECTION

PATENT NO. : 7,009,489 B2 
DATED : March 7, 2006
INVENTOR(S) : Scott R. Fisher

It is certified that error appears in the above-identified patent and that said Letters Patent is hereby corrected as shown below:

Column 27,
Line 51, delete "oft-be" and insert -- of the --.
Lines 53 and 54, delete "use's" and insert -- user's --
Line 54, delete "(I)" and insert -- (f) --.

Column 28,
Line 43, delete "alter" and insert -- after --.

Column 30,
Line 56, delete "dine" and insert -- time --.

Column 31,
Line 14, delete "wit" and insert -- with --.
Line 31, delete "tat" and insert -- that --.

Column 32,
Line 25, delete "lack" and insert -- lock --

Signed and Sealed this

Sixth Day of June, 2006

JON W. DUDAS
*Director of the United States Patent and Trademark Office*